US011636329B2

(12) United States Patent
Li et al.

(10) Patent No.: US 11,636,329 B2
(45) Date of Patent: Apr. 25, 2023

(54) REAL TIME IMPLEMENTATION OF RECURRENT NETWORK DETECTORS

(71) Applicant: University of Florida Research Foundation, Inc., Gainesville, FL (US)

(72) Inventors: Kan Li, Gainesville, FL (US); Jose C. Principe, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 1206 days.

(21) Appl. No.: 16/114,352

(22) Filed: Aug. 28, 2018

(65) Prior Publication Data
US 2019/0065950 A1   Feb. 28, 2019

Related U.S. Application Data

(60) Provisional application No. 62/550,731, filed on Aug. 28, 2017.

(51) Int. Cl.
*G06N 3/08*     (2006.01)
*G06N 3/04*     (2006.01)
(Continued)

(52) U.S. Cl.
CPC ........... *G06N 3/08* (2013.01); *G06K 9/00503* (2013.01); *G06K 9/00536* (2013.01);
(Continued)

(58) Field of Classification Search
CPC .... G06N 3/08; G06N 3/0445; G06K 9/00503; G06K 9/00536; G06K 9/62
See application file for complete search history.

(56) References Cited

U.S. PATENT DOCUMENTS

| 8,756,265 B1* | 6/2014 | Halevy | H03H 17/0258 |
| | | | 708/300 |
| 2008/0101705 A1* | 5/2008 | Mohamed | G06V 40/10 |
| | | | 382/224 |

(Continued)

OTHER PUBLICATIONS

"The Kernel Adaptive Autoregressive-Moving-Average Algorithm", Li et al. IEEE Trans. on Neural Networks and Learning Systems, vol. 1, No. 1, Jan. 2015.*
(Continued)

*Primary Examiner* — Qun Shen
(74) *Attorney, Agent, or Firm* — Thomas | Horstemeyer, LLP

(57) ABSTRACT

Various examples related to real time detection with recurrent networks are presented. These can be utilized in automatic insect recognition to provide accurate and rapid in situ identification. In one example, among others, a method includes training parameters of a kernel adaptive autoregressive-moving average (KAARMA) using a signal of an input space. The signal can include source information in its time varying structure. A surrogate embodiment of the trained KAARMA can be determined based upon clustering or digitizing of the input space, binarization of the trained KAARMA state and a transition table using the outputs of the trained KAARMA for each input in the training set. A recurrent network detector can then be implemented in processing circuitry (e.g., flip-flops, FPGA, ASIC, or dedicated VLSI) based upon the surrogate embodiment of the KAARMA The recurrent network detector can be configured to identify a signal class.

20 Claims, 17 Drawing Sheets

(51) Int. Cl.
G06K 9/62 (2022.01)
G06K 9/00 (2022.01)
G06N 3/063 (2006.01)
G06V 10/94 (2022.01)
G06V 20/40 (2022.01)
G06N 3/084 (2023.01)
G06N 3/088 (2023.01)

(52) U.S. Cl.
CPC .......... *G06K 9/622* (2013.01); *G06K 9/6273* (2013.01); *G06N 3/0445* (2013.01); *G06N 3/063* (2013.01); *G06N 3/084* (2013.01); *G06V 10/955* (2022.01); *G06V 20/40* (2022.01); *G06N 3/0454* (2013.01); *G06N 3/0481* (2013.01); *G06N 3/088* (2013.01)

(56) References Cited

U.S. PATENT DOCUMENTS

| | | | | |
|---|---|---|---|---|
| 2011/0004475 | A1* | 1/2011 | Bellegarda | G10L 15/187 704/251 |
| 2015/0220832 | A1* | 8/2015 | Lazar | G06N 3/049 706/25 |

OTHER PUBLICATIONS

Reed, et al., "Frequency of wing-beat as a charachter for separating species races and geographic varieties of *Drosophila*". Genetics 27, May 1942.

Davis, et al., "Comparison of parametic representations for monosyllabic word recognition in continuously spoken sentences", IEEE Transations on Acoustics, Speech, and Signal Processing, vol. ASSP-28, No. 4, Aug. 1980.

Atal, et al., "Speech analysis and synthesis by linear prediction of the speech wave", Bell Telephone Laboratories, The Journal of the Acoustical Society of America, Apr. 1971.

Silva, et al., "Applying machine learning and audio analysis techniques to insect recognition in intelligent traps", 2013 12th International conference on Machine Learning and Applications, Dec. 2013.

Vincent, et al., Extracting and composing robust features with denoising autoencoders, International conference on Machine Learning, May 2008.

Liu, Weifeng, "Correntropy: Properties and applications in nonfaussian signal processing", IEEE, Apr. 6, 2006.

Scholkopf, et al., "A generalized representer theorem", COLT/EuroCOLT 2001, LNAI 2111, pp. 416-426, 2001. Springer-Verlag Berlin Heidelberg 2001.

Chomsky, Noam, "Three models for the description of language", IRE Transactions on Information Theory, vol. 2, Issue: 3, Sep. 1956.

Gold, Mark E., "Complexity of automaton identification from given data", Academic Press, Inc. Jun. 1, 1978.

Smith, Carl H., "Inductive inference: theory and methods", Computing Surveys, Vo., 15, No. 3, Sep. 1983.

McCulloch, et al., "A logical calculus of the ideas immanent in nervous activity", Pergamon Press, Society of mathematical biology, vol. 52, No. 1/2, Dec. 1943.

Siegelmann, et al., "On the computational power of neural nets", ACM, Jul. 1992.

Molanes, et al., "Deep learning and reconfiguable platforms in the internet of things", Challenges and Opportunities in Algorithms and Hardware, IEEE Industrial Electronics Magazine, Jun. 2018.

Merenda, et al., "Edge machine learning for AI-enabled IoT Devices: a review", Sensors MDPI, Mar. 20, 2020.

Li, et al., "Biologically-Inspired Spike-Based Automatic Speech Recognition of Isolated Digits Over a Reproducing Kernel Hilbert Space", Frontiers in Neuroscience, Apr. 3, 2018.

Latif, et al., "Deep Learning for the Industrial Internet of Things (IIoT): A Comprehensive Survey of Techniques, Implementation Frameworks, Potential Applications, and Future Directions", Sensors MDPI, Oct. 11, 2021.

* cited by examiner

| Species | Train | Test | All |
|---|---|---|---|
| Yellow Fever Mosquito (*Aedes aegypti*) | 800 | 104 | 904 |
| Common Housefly (*Musca domestica*) | 800 | 117 | 917 |
| Common Fruit Fly (*Drosophila melanogaster*) | 800 | 154 | 954 |
| Southern House Mosquito (*Culex quinquefasciatus*) | 800 | 485 | 1285 |
| Western Encephalitis Mosquito (*Culex tarsalis*) | 800 | 465 | 1265 |
| Total | 4000 | 1325 | 5325 |

Example Using Non-Numeric Data

Algorithm 1: Finite State Machine Extraction Algorithm

Initialization:
$\Omega$: a trained $L$-category AR classifier
$q_0$: initial state
$u_1$: first input vector
$Q = \{q_0\}$: state alphabet
$\Sigma = \{u_1\}$: input alphabet
$q_{state}$: state space quantization factor
$q_{input}$: input space quantization factor
$\delta$: state transition table
$F_\ell = \{\}$: accept states for class $\ell$

Form State and Input Alphabets:
for training sample $1, \cdots, n$ do
    for input vector $i = 1, \cdots, t$ do
        Compute minimum distance between $u_i$ and $\Sigma$
        if $d_{min}^{(u)} < q_{input}$ then
            $u_i = u_i^*$ nearest neighbor
        else
            $\Sigma = \{\Sigma, u_i\}$
        Generate Next State (23)
        $s_i = \Omega^T \psi(s_{i-1}, u_i)$
        Compute minimum distance between $s_i$ and $Q$
        if $d_{min}^{(s)} < q_{state}$ then
            $s_i = s_i^*$ nearest neighbor
        else
            $Q = \{Q, s_i\}$

Fill State Transition Table:
for state $i = 1, \cdots, |Q|$ do
    for input $j = 1, \cdots, |\Sigma|$ do
        Generate Next State (23)
        $s = \Omega^T \psi(s_i, u_j)$
        Compute minimum distance between $s$ and $Q$
        $i^* = \arg\min_{1 \leq i \leq |Q|} \text{dist}(s, s_i)$
        $\delta(i, j) = i^*$

Determine Accept State:
$y_i = \Gamma s_i$ (24)
$\ell^* = \arg\max_{1 \leq \ell \leq L} y_i^{(\ell)}$
$F_{\ell^*} = \{F_{\ell^*}, s_i\}$

Finite State Machines:
for class $\ell = 1, \cdots, L$ do
    $A_\ell = \langle Q, \Sigma, \delta, q_0, F_\ell \rangle$

FIG. 8

| (#Mel) | Method \ Species | Aedes aegypti | Musca domestica | Drosophila melanogaster | Culex quinquefasciatus | Culex tarsalis | Overall |
|---|---|---|---|---|---|---|---|
| Static Pattern (100) | MFCC+SVM | 90.0% ± 2.8% | 90.5% ± 2.2% | 82.7% ± 2.2% | 91.0% ± 1.3% | 83.9% ± 0.8% | 87.4% ± 0.5% |
| | Mel+SVM | 88.4% ± 2.8% | 93.6% ± 1.6% | 84.9% ± 4.0% | 91.5% ± 1.7% | 91.4% ± 1.3% | 90.7% ± 0.9% |
| | Mel+KNN | 82.4% ± 4.7% | 98.7% ± 1.0% | 80.5% ± 1.6% | 90.1% ± 1.9% | 89.9% ± 1.1% | 89.1% ± 0.8% |
| | R-SAE+SVM(50) | 89.6% ± 3.7% | 95.2% ± 1.6% | 90.0% ± 2.2% | 92.2% ± 1.3% | 92.2% ± 1.6% | 92.1% ± 0.7% |
| | R-SAE+SVM(10) | 88.0% ± 2.5% | 94.3% ± 1.7% | 88.2% ± 2.5% | 91.4% ± 0.9% | 92.3% ± 0.8% | 91.4% ± 0.5% |
| | R-SAE+Softmax(50) | 88.6% ± 2.0% | 93.4% ± 3.0% | 88.4% ± 2.6% | 91.4% ± 1.4% | 92.2% ± 1.9% | 91.3% ± 0.9% |
| | R-SAE+Softmax(10) | 87.3% ± 2.7% | 91.9% ± 1.9% | 88.3% ± 2.9% | 91.5% ± 1.8% | 92.0% ± 1.3% | 91.0% ± 0.6% |
| (40) | KAARMA | 91.0% ± 2.4% | 97.1% ± 1.8% | 88.3% ± 3.4% | 93.4% ± 1.1% | 94.3% ± 1.3% | 93.2% ± 0.7% |
| (40) | KAARMA | 89.42% | 93.73% | 96.73% | 94.23% | 96.77% | 95.17% |
| (20) | KAARMA | 88.46% | 96.58% | 93.56% | 95.46% | 94.41% | 94.19% |
| (12) | KAARMA | 86.15% | 97.44% | 85.77% | 94.02% | 90.11% | 92.15% |
| Static, Batch (50) | SVM, Puk kernel with ω, σ = 1 | | | | | | 93.93% |
| | Random Forest, Trees = 15 | | | | | | 92.09% |
| | KNN, Neighbors = 1, Euclidean dist. | | | | | | 92.08% |
| | GMM, Gaussians = 10 | | | | | | 91.56% |
| | RBF Network, Clusters = 5 | | | | | | 89.92% |

FIG. 9

| Lookup RAM size | Power, μW | Area, $mm^2$ |
|---|---|---|
| 3392*8bits | 15.3 | 1.0 |
| 2544*8bits | 14.1 | 0.92 |
| 1696*8bits | 10.5 | 0.83 |

REAL TIME IMPLEMENTATION OF RECURRENT NETWORK DETECTORS

CROSS-REFERENCE TO RELATED APPLICATIONS

This application claims priority to, co-pending U.S. Provisional Application entitled "REAL TIME DETECTION WITH RECURRENT NETWORKS," filed on Aug. 28, 2017, and assigned application No. 62/550,731, which is hereby incorporated by reference in its entirety.

STATEMENT REGARDING FEDERALLY SPONSORED RESEARCH OR DEVELOPMENT

This invention was made with government support under contracts N66001-10-C-2008 awarded by the U.S. Department of Defense, and N66001-15-1-4054, awarded by the U.S. Department of Defense/DARPA. The government has certain rights in the invention.

BACKGROUND

Conventional machine learning methods use the same training embodiment for testing and implementation. The training architecture scales nonlinearly to the complexity of the task to provide sufficient learning and generalization capability. For mobile and resource constrained applications, the conventional approach is to decrease power by selecting fixed point processors instead of the conventional dual precision floating point, which unfortunately also decreases the accuracy of the processing. This solution will not be able to respond to the requisites of Internet of Things (IoT) applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is an example of a finite state machine extraction, in accordance with various embodiments of the present disclosure.

FIG. 9 is a table illustrating a performance comparison of automatic insect recognition (AIR) results, in accordance with various embodiments of the present disclosure.

DETAILED DESCRIPTION

Figures 1, 2:
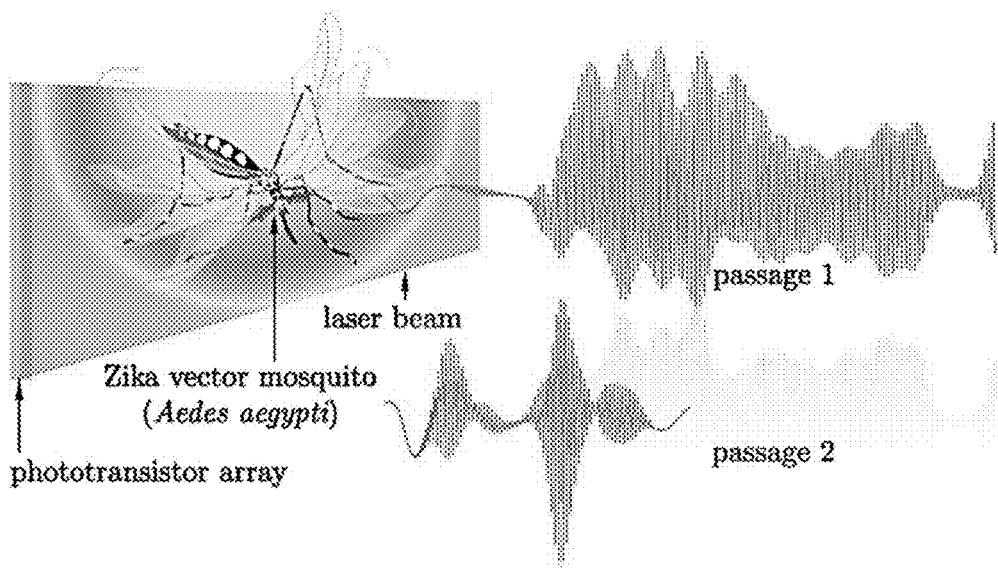
FIG. 1 illustrates an example of optical recordings of a Zika vector, in accordance with various embodiments of the present disclosure.
FIG. 2 is a table illustrating an example of a flying insect dataset, in accordance with various embodiments of the present disclosure.

Disclosed herein are various examples related to real time detection with recurrent networks. Recurrent network detectors can be implemented in synchronous circuits including a CPU and/or DSP, asynchronous FPGAs, or special purpose ASICs and requiring only memory and flipflops. These detectors can be used to identify signal source information that is contained in its time varying structure. Signals can include, but are not limited to, speech, video, multi-dimensional sensed inputs in industrial installations and/or natural phenomena. This disclosure outlines a design methodology to convert any statistically trained recurrent network detector into an equivalent ultra-low power embodiment and presents possible real time hardware implementations. Reference will now be made in detail to the description of the embodiments as illustrated in the drawings, wherein like reference numbers indicate like parts throughout the several views.

As a proof of concept for pattern detection in spatiotemporal signals, a real time recurrent network detector for flying insects was developed. Insects are vital to our ecosystem. The most diverse group of animals, they permeate all terrestrial environments, sharing and often competing for the same resources with humans. They directly impact agricultural production both positively and negatively. Insects make up a majority of the pollinators responsible for over 35% of the worldwide food-crop production volume, and more than 75% of the leading food crops rely on pollinators for yield or quality, with an annual market estimate of $577 billion. Approximately 90% of all wild flowering plant species are pollinator-dependent, and the distribution and density of insects act as important bioindicators of environmental stress for terrestrial ecosystems.

Insects can also be extremely disruptive. Left uncontrolled, many species feed on cash crops, damage stored foods, and destroy building materials. In the U.S. alone, pesticides were responsible for roughly $40 billion saved crops. Pesticide expenditures in 2007 reached more than $39 billion worldwide ($12 billion in the U.S.) with insecticides accounting for 28% (39% in the U.S.) of the total. Many species of insects are also vectors of disease and have a profound impact on human and animal health, particularly flying insects in the family Culicade or mosquitoes. Mosquito-borne illnesses include chikungunya, dengue, malaria, West Nile virus, yellow fever, and the recently prevalent Zika fever. The World Health Organization estimates that 17% of all infectious diseases are vector borne, responsible for over one million annual deaths, and with over half of the world's population at risk. Birth defects in Brazil have doubled since the Zika epidemic. Due to the lack of vaccines or effective treatment of certain diseases, as in the case of Zika, insecticides are used for vector control. However, most methods of applying insecticides, such as aerial spraying for mosquitoes, miss their intended targets and can cause detrimental effects on public health, the environment, and society. Scientists have linked changes in behavior and colony failures in bees (responsible for almost 80% of all insect pollination) to pesticides. Furthermore, insecticides' effectiveness diminishes over time as vectors develop increasing resistance.

Accurate, automatic, and rapid identification in situ is key to combat agricultural pests and disease vectors, and to monitor beneficial insects such as pollinators. Noninvasive and inexpensive intelligent traps are an emerging technology in computational entomology. Flying insects may be lured into its entrance using an attractant. Airflow from a fan gently guides it across a laser sensor, comprising a planar laser source aimed at a phototransistor array. Fluctuations in light intensity caused by wingbeat occlusions can be captured by the phototransistor and analyzed in real-time for classification. FIG. 1 illustrates an example of optical sensings of a Zika vector (Aedes aegypti). The chamber door is opened for a positive identification. Otherwise, the insect is released by reversing the fan airflow.

Automatic insect recognition (AIR) is at the core of making intelligent traps a viable solution. Early work on optical flight information examined the wingbeat frequency as the sole discriminating feature for classifying species of fruit flies using a stroboscope. More recently, inspired by speech processing, features such as mel-frequency cepstral coefficients (MFCCs) and linear predictive coding coefficients (LPCs) have been extracted from laser-sensor signals to perform AIR, using machine learning techniques such as support vector machine (SVM), k-nearest neighbors (KNN), decision trees, Gaussian mixture model (GMM), or a combination of algorithms. A deep learning algorithm has been applied to Melspectrum features. Specifically, a class of stacked autoencoder (SAE), trained using maximum correntropy criterion (MCC), coupled with SVM classifier can be used.

The major drawback with existing approaches is that the insect passages are evaluated as static patterns, rather than analyzing the optical flight information as a time series. It is viewed as a single quasi-stationary acoustic frame. In order to compensate for the variations in signal duration, centering and zero padding can be performed across passages, after filtering, to generate signals of uniform length, with a single vector of cepstral coefficients extracted from an entire passage. However, as can be seen from FIG. 1, flight recordings exhibit large variations in duration, even within the same species, with distinct and varying dynamics across passages.

A novel approach to AIR is proposed by treating each insect passage as a nonstationary process involving a sequence of multiple pseudo-acoustic frames and modeling the short-term flight dynamics using the kernel adaptive autoregressive-moving average (KAARMA) algorithm. KAARMA is an online adaptive algorithm trained with recurrent stochastic gradient descent in reproducing kernel Hilbert spaces (RKHSs) to model spatiotemporal signals using state-space trajectories. It achieves the appropriate memory depth via feedback of its internal states and is trained discriminatively, utilizing the full context of the input sequences. Since flight behavior is both nonlinear and nonstationary in nature, dynamic modeling using KAARMA provides a general framework that fully exploits the transitional and contextual information. Furthermore, it provides native support for sequences of varying length, eliminating the need for zero padding and centering signals collected from different passages. The insect flight information can be captured using laser sensors and can be modeled as a dynamical system. As a proof of concept, the capabilities of a single multiclass KAARMA network to automatically recognize flying insects is demonstrated using a dataset comprising three well-known disease vectors and two common fly species. A table listing the flying insect dataset is provided in FIG. 2. It is shown that the proposed KAARMA classifier outperforms all previously reported accuracies, including state-of-the-art AIR methods using deep learning autoencoders and batch learning, while using significantly more data-efficient representation.

Multiclass Kernel Adaptive Autoregressive-Moving Average. The KAARMA algorithm will now be briefly described. Let a dynamical system be defined in terms of a general nonlinear state transition function $x_i = g(s_i - 1, u_i)$ and an observation function $y_i = h(x_i) = h \circ g(s_i - 1, u_i)$, where $u_i \in \mathbb{R}^{n_u}$ is the input, $x_i \in \mathbb{R}^{n_x}$ is the hidden state, $y_i \in$ $$\mathbb{R}^{n_y}$$

is the output, and $s_i \triangleq [x_i, y_i]^T$ is the augmented state vector. Applying the theory of RKHS, the state-space model (SSM) in the joint RKHS $\mathcal{H}_{su} \triangleq \mathcal{H}_s \otimes \mathcal{H}_u$ can be expressed as the functional weights:

$$\Omega \triangleq \Omega_{\mathcal{H}_{su}} \triangleq \begin{bmatrix} g(\cdot, \cdot) \\ h \circ g(\cdot, \cdot) \end{bmatrix},$$

where $\otimes$ is the tensor-product operator. The kernel SSM becomes $s_i = \Omega^T \omega(Si-1) \otimes \phi(u_i)$ and $y_i = \mathbb{I} s_i$, where $\mathbb{I} \triangleq [0 \mathbb{I}_{n_y}]$ is a fixed selector matrix, with $\mathbb{I}_{n_y}$ being an $n_y \times n_y$ identity matrix.

Figure 3:
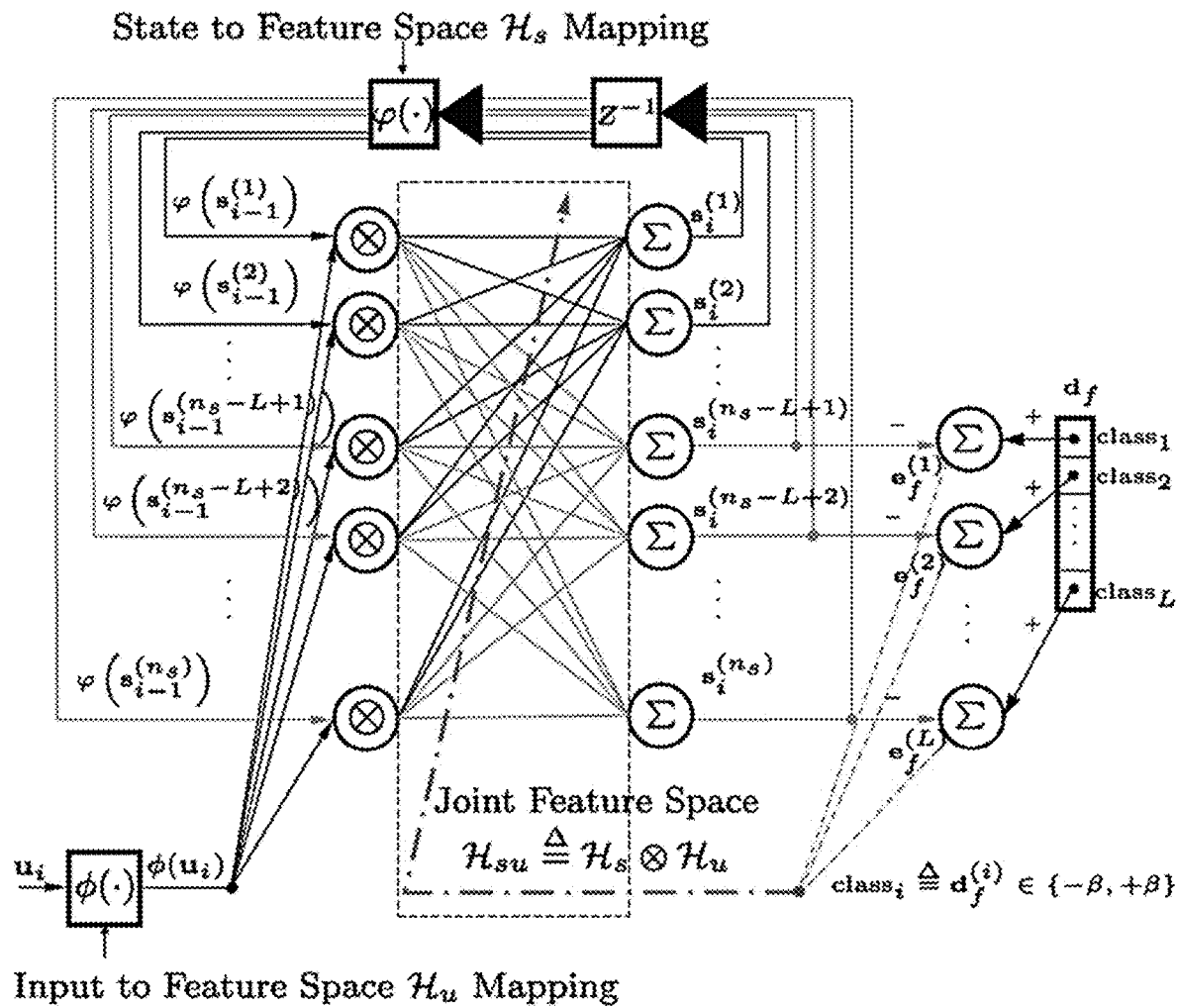
FIG. 3 is a schematic diagram illustrating an example of a multiclass kernel adaptive autoregressive-moving average (KAARMA) network, in accordance with various embodiments of the present disclosure.

Referring to FIG. 3, shown is a schematic diagram of an example of a multiclass KAARMA network (an L-category KAARMA classifier). The states $s_i$ can be assumed hidden, and a deferred desired value or label $d_f$ may only be observed at the end of a sequence or at the final time index i=f. Entries in the L-dimensional label vectors $d_f \in \mathbb{R}^L$ can be set to be binary, i.e., $d_f^{(i)} \in \{-\beta, +\beta\}$, where only the correct class has positive polarity, with fixed amplitude) $\beta \leq 1$. For a trained network, the output unit with the largest positive value indicates the class prediction.

Stochastic Gradient Descent. The exact error gradient in the RKHS can be computed at the end of each input sequence, using the Gaussian kernel:

$$\mathcal{K}_\alpha(u, u')=\exp(-\alpha\|u-u'\|^2),$$

where $\alpha>0$ is the kernel parameter. The joint inner products can be computed using $K_{\alpha_s}(s,s')$ and $K_{\alpha_u}(u,u')$, respectively. The error gradient with respect to the weights in the RKHS at time i is:

$$\frac{\partial \varepsilon_i}{\partial \Omega_i} = -e_i^T \frac{\partial y_i}{\partial \Omega_i} = -e_i^T \frac{\partial y_i}{\partial s_i}\frac{\partial s_i}{\partial \Omega_i}, \quad (1)$$

where $e_i = d_i - y_i \in \mathbb{R}^{n_y \times 1}$ is the error vector $$\frac{\partial y_i}{\partial s_i} = \mathbb{I},$$

and the partial derivative $$\frac{\partial s_i}{\partial \Omega_i}$$

consists of $n_s$ state terms, $$\frac{\partial s_i}{\partial \Omega^{(1)}}, \frac{\partial s_i}{\partial \Omega^{(2)}}, \dots, \frac{\partial s_i}{\partial \Omega^{(n_s)}}.$$

For the k-th state component of $\Omega_i$, the gradient can be expanded using the product rule as:

$$\frac{\partial s_i}{\partial \Omega_i^{(k)}} = \frac{\partial \Omega_i^T \varphi(s_{i-1}) \otimes \phi(u_i)}{\partial \Omega_i^{(k)}} \quad (2)$$

$$= \Omega_i^T \frac{\partial \varphi(s_{i-1}) \otimes \phi(u_i)}{\partial \Omega_i^{(k)}} + I_{n_s}^{(k)}(\varphi(s_{i-1}) \otimes \phi(u_i))^T,$$

where $\mathbb{I}_{n_s}^{(k)} \in \mathbb{R}^n$ is the $n_s \times n_s$ identity matrix's k-th column. Using the representer theorem, $\Omega_i$ can be written as a linear combination of prior features $\Omega_i = \Psi_i A_i$ where $\Psi_i \triangleq [\phi(s-1) \otimes \phi(u_0), \dots, \phi(s_{m-2}) \otimes \phi(u_{m-1})] \in \mathbb{R}^{n_{10s} \times m}$ is a collection of the m past tensor-product features with potentially infinite dimension $n_\psi$, and $A_i \triangleq [\alpha_{i,1}, \dots, \alpha_{i,n_s}] \in \mathbb{R}^{m \times n_s}$ is the set of corresponding coefficients. The k-th component $(1 \leq k \leq n_s)$ becomes $\Omega_i^{(k)} = \Psi_i A_i^{(k)} = \Psi_i \alpha_{i,k}$.

Substituting the expression for $\Omega_i$ into the feedback gradient on the right-hand side of Equation (2) and applying the chain rule gives:

$$\Omega^T \frac{\partial \varphi(s_{i-1}) \otimes \phi(u_i)}{\partial \Omega^{(k)}} = \Lambda_i^T \frac{\partial \Psi_i^T \varphi(s_{i-1}) \otimes \phi(u_i)}{\partial s_{i-1}} \frac{\partial s_{i-1}}{\partial \omega_i^{(k)}}, \quad (3)$$

$$= \underbrace{2a_s A_i^T K_i D_i^T}_{\Lambda_i} \frac{\partial s_{i-1}}{\partial \Omega_i^{(k)}}$$

where $\Psi_i \triangleq \operatorname{diag}(\Psi_i^T \Omega(s_i-1) \otimes \phi(u_i))$ is a diagonal matrix with eigenvalues $K_i^{(j,i)} = K_{\alpha_s}(s_j S_i - 1) \cdot K_{\alpha_u}(u_j, u_i)$ and $D_i \triangleq [(s-$ $1-s_{o-1}), \dots, (s_{m-2}-s_i-1)]$ is the difference matrix between state centers of the filter and the current input state $s_{1-}$. Define the state-transition gradient matrix as $$\Lambda_i \triangleq \frac{\partial s_i}{\partial s_{i-1}} = 2a_s A_i^T K_i D_i^T.$$

Substituting Equation (3) into Equation (2) yields:

$$\frac{\partial s_i}{\partial \Omega_i^{(k)}} = \Lambda_i \frac{\partial s_{i-1}}{\partial \Omega_i^{(k)}} + I_{n_s}^{(k)}(\varphi(s_{i-1}) \otimes \phi(u_i))^T. \quad (4)$$

The state gradient of Equation (4) is independent of any teacher signal, i.e., error $e_i$, so the state gradients can be forward propagated in the recursion. The initial state is user-defined and functionally independent of the filter weights. By setting $$\frac{\partial s_0}{\partial \Omega_i^{(k)}} = 0,$$

the basis functions can be factored out and the recursion expressed as:

$$\frac{\partial s_i}{\partial \Omega_i^{(k)}} = \Lambda_i V_{i-1}^{(k)} \Psi_{i-1}'^T + I_{n_s}^{(k)}(\varphi(s_{i-1}) \otimes \phi(u_i))^T , \quad (5)$$

$$= [\Lambda_i V_{i-1}^{(k)}, I_{n_s}^{(k)}][\Psi_{i-1}', \varphi(s_{i-1}) \otimes \phi(u_i)]^T$$

$$= V_i^{(k)} \Psi_i'^T$$

where $\Psi_i' = \bullet_{i-1}^T, \varphi(s_{i-1}) \otimes \phi(u_i)] \in \mathbb{R}^{n_\psi \times i}$ are centers generated by the input sequence and forward-propagated states from a fixed filter weight $\Omega_i$, and $V_i^{(k)} \triangleq [\Lambda_i V_{i-1}^{(k)}, \mathbf{I}_{n_s}^{(k)}] \in \mathbb{R}^{n_s \times i}$ is the updated state-transition gradient, with initializations $V_1^{(k)} = \mathbf{I}_{n_s}^{(k)} V_i^{(k)} = \mathbf{I}_{n_s}^{(k)}$, and $\Psi_i' = [\phi(s_0) \otimes \phi(u_1)]$.

Updating the weights in the negative direction yields:

$$\Omega_{i+1}^{(k)} = \Omega_i^{(k)} + \eta \Psi_i' (\mathbb{1} V_i^{(k)})^T e_i , \quad (6)$$

$$= [\Psi_i, \Psi_i'] \begin{bmatrix} A_i^{(k)} \\ \eta(\mathbb{1} V_i^{(k)})^T e_i \end{bmatrix}$$

$$\triangleq \Psi_{i+1} A_{i+1}^{(k)}$$

where $\eta$ is the learning rate. Since the weights are updated online, to reduce redundancy and better ensure stability, each new center can be evaluated from the feature update $\Psi'$ with existing ones in $\Psi$ using the quantization method outlined in "The kernel adaptive autoregressive-moving-average algorithm" by K. Li et al. (*IEEE Trans. Neural Netw. Learn. Syst.*, 2015), which is hereby incorporated by reference in its entirety, controlled by a threshold factor q.

Figure 4:
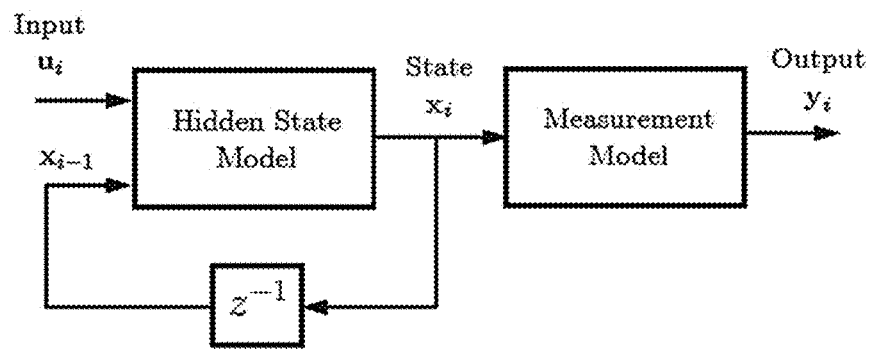
FIG. 4 is a block schematic of a general state-space model for a dynamical system, in accordance with various embodiments of the present disclosure.

Recurrent Network in RKHS. FIG. 4 is a block schematic illustrating a general state-space model for a dynamical system. Let a dynamical system such as the one in FIG. 4 be defined in terms of a general continuous nonlinear state transition and observation functions, f(·,·) and h(·), respectively, $$x_i = f(x_{i-1}, u_i) \tag{7}$$

$$y_i = h(x_i) \tag{8}$$

$$f(x_{i-1}, u_i) \triangleq \left[ f^{(1)}(x_{i-1}, u_i), \cdots, f^{(n_x)}(x_{i-1}, u_i) \right]^T \tag{9}$$

$$= \left[ x_i^{(1)}, \cdots, x_i^{(n_x)} \right]^T$$

$$h(x_i) \triangleq \left[ h^{(1)}(x_i), \cdots, h^{(n_y)}(x_i) \right]^T, \tag{10}$$

$$= \left[ y_i^{(1)}, \cdots, y_i^{(n_y)} \right]^T$$

with input $u_i \in \mathbb{R}^{n_u}$, state $x_i \in \mathbb{R}^{n_x}$, output $y_i \in \mathbb{R}^{n_y}$, and the parenthesized superscript $^{(k)}$ indicating the k-th component of a vector or the k-th column of a matrix. Note that the input, state, and output vectors have independent degrees of freedom or dimensionality. For simplicity, rewriting Eqns. (7) and (8) in terms of a new hidden state vector gives:

$$s_i \triangleq \begin{bmatrix} x_i \\ y_i \end{bmatrix} = \begin{bmatrix} f(x_{i-1}, u_i) \\ h \circ f(x_{i-1}, u_i) \end{bmatrix} \tag{11}$$

$$y_i = s_i^{(n_s - n_y + 1 : n_s)} = \underbrace{[0 \; I_{n_y}]}_{\mathbb{I}} \begin{bmatrix} x_i \\ y_i \end{bmatrix}, \tag{12}$$

where $\mathbf{I}_{n_y}$ is an $n_y \times n_y$ identity matrix, 0 is an $n_y \times n_x$ zero matrix, and $\circ$ is the function composition operator. This augmented state vector $s_i \in \mathbb{R}$ is formed by concatenating the output $y_i$ with the original state vector $x_i$. With this rewriting, measurement equation simplifies to a fixed selector matrix $\mathbb{I} \triangleq [0 \; \mathbb{I}_{n_y}]$.

Next, define an equivalent transition function $g(s_{-1}, u_i) = f(x_{i-1}, u_i)$ taking as the argument the new state variable $s$. Using this notation, Eqns. (7) and (8) become:

$$x_i = g(s_{i-1}, u_i): \tag{13}$$

$$y_i = h(x_i) = h \circ g(s_{i-1}, u_i). \tag{14}$$

To learn the general continuous nonlinear transition and observation functions, $g(\cdot, \cdot)$ and $h \circ g \cdot, \cdot$, respectively, the theory of RKHS can be applied. For a parametric approach or weight-space view to regression, a latent function $f(u)$ is expressed in terms of a parameters vector or weights w. In the standard linear form:
$f(u) = w^T u$.
To overcome the limited expressiveness of this model, the nu-dimensional input vector $u \in \mathbb{U} \subseteq \mathbb{R}$ (where $\mathbb{U}$ U is a compact input domain in $\mathbb{R}^{n_u}$) can be projected into a potentially infinite-dimensional feature space $\mathbb{F}$. Define a $\mathbb{U} \to \mathbb{F}$ mapping $\Phi(u)$, the parametric model of Equation (15) becomes $$f(u) = \Omega^T \Phi(u), \tag{16}$$

where $\Omega$ is the weight vector in the feature space.

Using the Representer Theorem (see, e.g., "A generalized representer theorem" by B. Scholkopf et al., *Proc. 14th Annual Conf. Comput. Learning Theory*, 2001, pp. 416-426, which is hereby incorporated by reference in its entirety) and the "kernel trick", Equation (16) can be expressed as:

$$f(u) = \sum_{i=1}^{N} \alpha_i \mathcal{K}(u_i, u), \tag{17}$$

where K(u,u') is a Mercer kernel, corresponding to the inner product $\langle \Phi(u), \Phi(u') \rangle$, and N is the number of basis functions or training samples. Note that $\mathbb{F}$ is equivalent to the RKHS induced by the kernel if $\Phi(u) = K(u, \bullet)$ is identified. The most commonly used kernel is the Gaussian kernel:

$$\mathcal{K}_\alpha(u, u') = \exp(+\alpha \|u - u'\|^2), \tag{18}$$

where $\alpha > 0$ is the kernel parameter.

First, the augmented state vector $s_i$ and the input vector $u_i$ can be mapped into two separate RKHSs as $\phi(s_i) \in H_s$ and $\varphi(u_i) \in H_u$, respectively. By the representer theorem, the state-space model defined by Equations (13) and (14) can be expressed as the following set of weights (functions in the input space) in the joint RKHS $\mathcal{H}_{su} \triangleq \mathcal{H}_s \otimes \mathcal{H}_u$ or $\mathcal{H}_{su} \triangleq \mathcal{H}_s \oplus \mathcal{H}_u$:

$$\Omega \triangleq \Omega_{\mathcal{H}_{su}} \triangleq \begin{bmatrix} g(\cdot, \cdot) \\ h \circ g(\cdot, \cdot) \end{bmatrix}, \tag{19}$$

where $\otimes$ is the tensor-product operator and $\oplus$ is the sum operator. The new features in the tensor-product RKHS can be defined as:

$$\Psi(s_{i-1}, u_i) \triangleq \Psi(s_{i-1}) \otimes \phi(u_i) \in \mathcal{H}_{su}. \tag{20}$$

It follows that the tensor-product kernel can be defined by:

$$\langle \psi(s, u), \psi(s', u') \rangle_{\mathcal{H}_{su}} = \mathcal{K}_{a_{su}}(s, u, s', u') \tag{21}$$

$$= (\mathcal{K}_{a_s} \otimes \mathcal{K}_{a_u})(s, u, s', u')$$

$$= \mathcal{K}_{a_s}(s, s') \cdot \mathcal{K}_{a_u}(u, u').$$

and the sum kernel can be defined by:

$$\langle \psi(s, u), \psi(s', u') \rangle_{\mathcal{H}_{su}} = \mathcal{K}_{a_{su}}(s, u, s', u') \tag{22}$$

$$= (\mathcal{K}_{a_s} \otimes \mathcal{K}_{a_u})(s, u, s', u')$$

$$= \mathcal{K}_{a_s}(s, s') + \mathcal{K}_{a_u}(u, u').$$

This construction has several advantages over the simple concatenation of the input u and the state s. First, the tensor product kernel and the sum kernel of two positive definite kernels are also positive definite kernels. Second, since the adaptive filtering is performed in an RKHS using features, there is no constraint on the original input signals or the number of signals, as long as the appropriate reproducing kernel is used for each signal. Finally, this formulation imposes no restriction on the relationship between the signals in the original input space. This can be important for input signals having different representations and spatiotemporal scales. For example, under this framework, a neurobiological system can be modeled, taking spike trains, continuous amplitude local field potentials (LFPs), and vectorized state variables as inputs.

Figure 5:
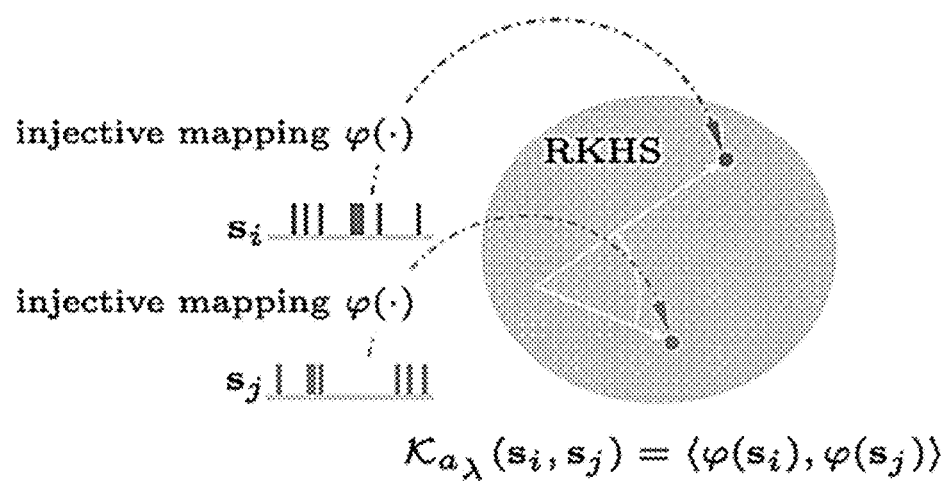
FIG. 5 is a graphical representation of an example of a reproducing kernel Hilbert space (RKHS) defined on spike trains, in accordance with various embodiments of the present disclosure.

FIG. 5 is a graphical representation illustrating an example of the injective mappings of two non-numeric input signals in a RKHS. The RKHS can be defined on spike trains using an appropriately selected reproducing kernel, e.g., a Schoenberg kernel. The inputs are transformed from the original input space into a potentially infinite dimensional feature space (Hilbert space). Applying the kernel trick allows inner products in this space to be computed without explicit reference to the input representation. Alternatively, for the spike train kernel, it is possible to take pairs of input spike trains and nonlinearly weight their respective firing rates estimated in temporal windows, take pairs of input spike trains and linearly weight their respective firing rates estimated in temporal windows, take a single spike train and nonlinearly weight its respective firing rate estimated in two different temporal windows, or take a single spike train and linearly weight its respective firing rate estimated in two different temporal windows.

Finally, the kernel state-space model becomes:

$$s_i = \Omega^T \Psi(s_{i-1}, u_i). \quad (23)$$

$$y_i = \mathbb{I} \, s_i. \quad (24)$$

Figure 6:
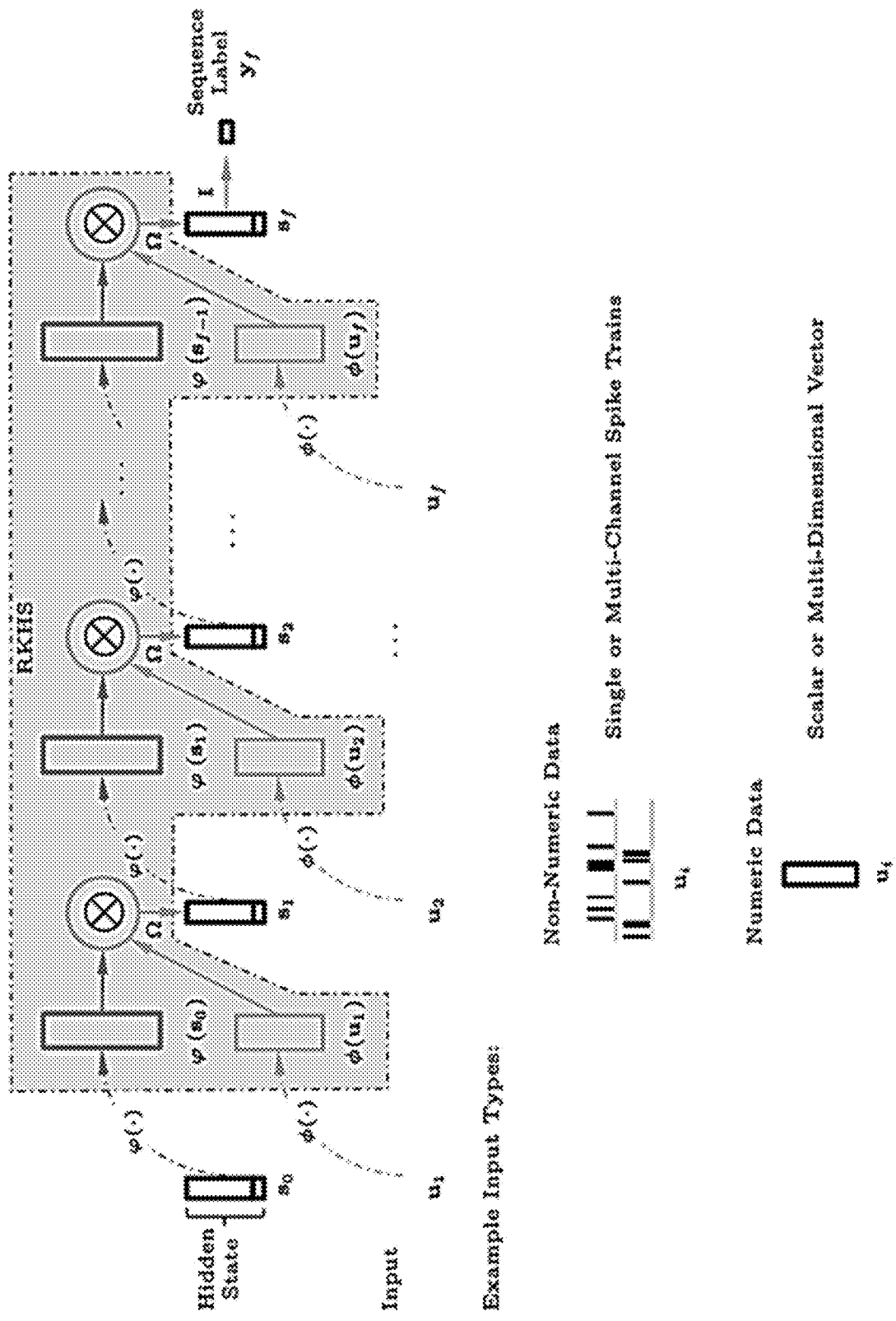
FIG. 6 is a graphical representation of an example of a recurrent or autoregressive (AR) network in an RKHS, in accordance with various embodiments of the present disclosure.

FIG. 6 shows an example of a simple recurrent or autoregressive (AR) network in RKHS, where the input stream can take any data type as long as an appropriate reproducing kernel is used to map it into a feature space. In general, the states Si are assumed hidden, and the desired state does not need to be available at every time step, e.g., a deferred desired output value for $y_i$ may only be observed at the final indexed step i=f, i.e., $d_f$.

The recurrent network in the RKHS can take any form, such as a linear autoregressive processing system in the RKHS, a linear state processing system in the RKHS, or a neural network in the RKHS. The training or learning procedure can be based on gradient descent using back-propagation, such as the kernel adaptive autoregressive-moving-average (KAARMA) algorithm or the kernel back-propagation through time (KBPTT) (see, e.g., "The kernel adaptive autoregressive-moving-average algorithm" by K. Li et al., *IEEE Trans. Neural Netw. Learn. Syst.*, 2015, which is hereby incorporated by reference in its entirety), based on fixed point iteration weight updates, based on Kalman filter update in the RKHS, or random initialization of weights.

Deterministic Encoding of Recurrent Networks. Based on the encoding of discrete-time recurrent network in a reproducing kernel Hilbert space (RKHS), a deterministic finite automaton (DFA) or finite state machine (FSM) can be constructed that recognizes a given regular language for syntactic pattern recognition with arbitrary accuracy. Finite state automata capable of modeling dynamical processes whose current state depends on the current input and previous states are examined. Specifically, a recurrent or autoregressive (AR) network in the RKHSs, which is trained to recognize a syntactic pattern with arbitrary accuracy, and the binarization of the continuous state space can be used to form the FSM. The fuzzy continuous states can be transformed into crisp DFA states using the following binarization rule: a membership label >0 is associated with each accepting DFA state; and label ≤0 is associated with each non-accepting DFA states. When the empty string is not learned, initial states are assumed to be non-accepting.

Finite State Machine Extraction. A discrete-time dynamical system (DTDS) in a discrete state space can be modeled by a finite state machine (FSM) or deterministic finite automaton (DFA), where all state transitions are uniquely determined by input symbols, from an initial state. In the theory of formal language, DFA recognize regular grammars in the Chomsky hierarchy of phrase-structure grammars, with two modes of operation: language validation and generation. From this perspective, DTDS identification can be viewed as grammatical inference problems: from a set of positive and negative training sequences, infer the grammar satisfying all available samples.

Formally, a DFA is a 5-tuple: $A = \langle Q, \Sigma, \delta q_0, F \rangle$, where Q denotes a finite set of states, $\Sigma$ is a finite alphabet of input symbols, $\delta$ is a state transition function ($\delta: Q \times \Sigma \to Q$), $q_0 \in Q$ is the initial state, and $F \subseteq Q$ is a set of accept states. The DFA can be represented by a state transition or lookup table. For a given sequence w over the alphabet $\Sigma$, the automaton A recognizes w if it transitions into an accept state on the last input symbol; otherwise, w is rejected. The set of all strings accepted by A forms the language L(A).

A grammar G is a 4-tuple: $G = \langle (N, T, P, S) \rangle$ where N and T are disjoint finite sets of nonterminal and terminal symbols, respectively, P denotes a set of production rules, and $S \in N$ is the start variable. Grammar G is regular if and only if every production rule in P has the form $B \to \alpha$, $B \to \alpha C$. or $B \to \epsilon$. where B and C are in N (allowing B=C), $\alpha \in T$, and denotes the empty string. The language defined by G is denoted by L(G). An automata is the analytical descriptor of a language; and the grammar, the generative descriptor. Language produced by regular grammar can be validated by the corresponding DFA. And, from A, one can easily construct a regular grammar such that L(G)=L(A).

However, grammar induction is NP-complete. Early solutions involve heuristic algorithms that scale poorly with the size of inferred automaton. Relationship between RNNs and DFA has been studied extensively since the 1940s. It has been shown that RNNs can simulate any FSM for arbitrary Turing machine in real-time. A recurrent network in the RKHS networks can infer grammars using far fewer training samples than RNNs.

Learning Finite Input and State Alphabets. Once the state-space model or AR network is trained in the RKHS to obtain optimal parameters, very high accuracy can be achieved. A different hardware embodiment can be designed that matches this performance using very simple implementations, e.g., just memory cells and flip-flops that implement finite state machines driven by the input data. Our technique involves three steps: first, cluster the input data; second, discretize the KAARMA state model obtained in training; third, built a transition table that pairs input clusters with discretized states, in such a way that guarantees the highest matching with the class assignments obtained with the trained statistical model. The curse of dimensionality associated with high-dimensional state and input spaces can be avoided by clustering only parts of the space where data is available. Using the spatial clustering method as outlined in "The kernel adaptive autoregressive-moving-average algorithm" by K. Li et al. (*IEEE Trans. Neural Netw. Learn. Syst.*, 2015), which is hereby incorporated by reference in its entirety, two quantization factors, $q_{input}$ and $q_{state}$, can be introduced for the input-space and state-space distance metric thresholds, respectively. The initial alphabets comprise the initial state and the first input vector. To form their respective alphabets $\Sigma$ and Q directly from the training data, input and state points (where next states are produced using the trained AR network) can be introduced to the spatial clustering algorithm or quantizer one at a time. The Euclidean distances are computed with respect to all previous data centers or letters in the alphabets. If the minimum distance for the new data point is smaller than the quantization factor, the dictionary or alphabet is kept the same; otherwise, the new point is added to the corresponding alphabet. This sparsification technique has been previously used to train KAARMA networks using significantly fewer data points than available. As the q factors increase, sparsity is also increased, as more and more data points are clustered into the same center. On the other hand, recognition accuracies are inversely proportional to the q factors, as with increased sparsity, data resolution is decreased, with parts of the input and state spaces not represented. Nonetheless, in practice, high recognition accuracies can still be retained using only a very small subset of the original continuous input-space and state-space points. Any input sample from a multidimensional data source is a point in a space given by the number of channels. Likewise, for a single time series, there is an embedding dimension given by the effective memory of the data source that also creates a multidimensional space. A training set is therefore a cloud of points in this high dimensional data space, and as such it can be clustered in many different ways depending upon the size of the cluster radius. Each cluster in the training set can therefore be labelled by a number. Instead of clustering, one can also utilize Voronoi tessellations by specifying the volume, or to apply self-organizing map (SOM) or Kohonen networks to create partitions, or any other technique like graphs. In the test set an input will then belong to one of these partitions, and can then be labelled by the partition number.

Figure 7:
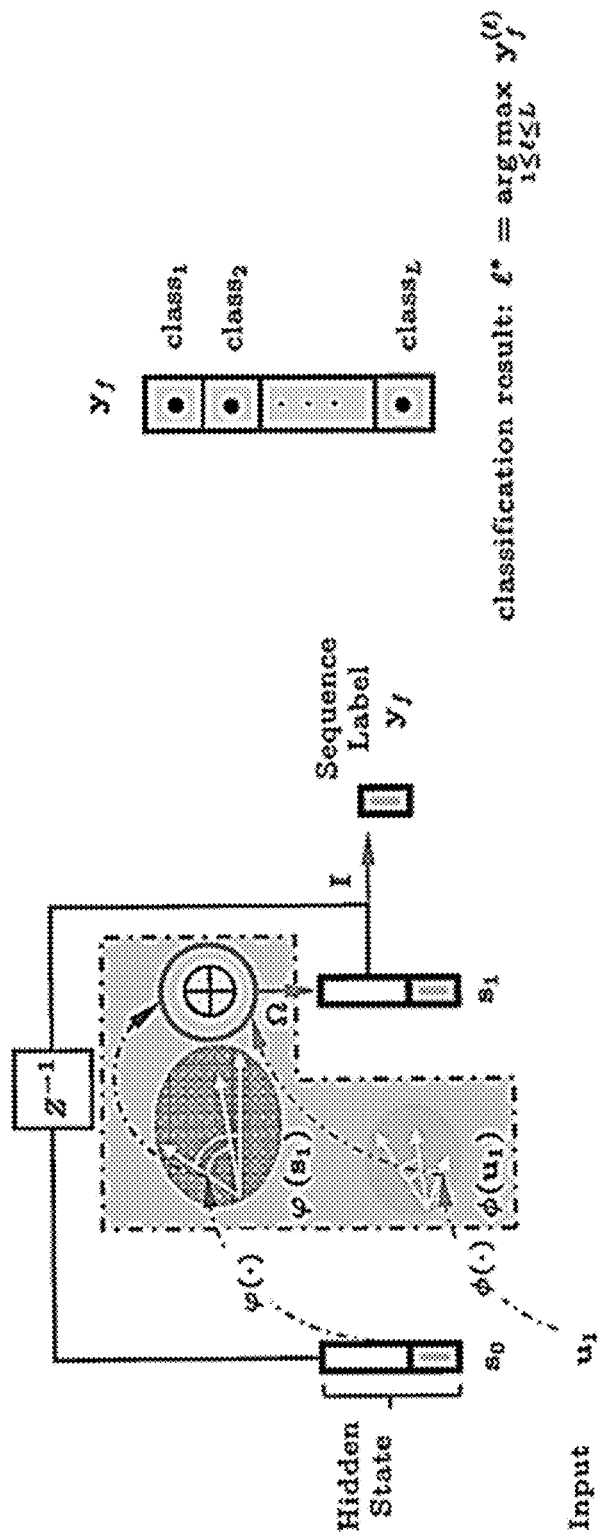
FIG. 7 is a graphical representation of an example of an L-category recurrent network in an RKHS, in accordance with various embodiments of the present disclosure.

Generating State Transition Table. Once the input and state alphabets of the FSM have been fixed by running the entire training data through the trained AR network and applying spatial clustering to all new data points using quantization factors $q_{input}$ and $q_{state}$, the state transition table can be mapped out ($\delta$: Q×Σ→Q) for any input-state pairs. Again, this can be accomplished by processing all input-state pairs in the alphabets Σ and Q through the trained AR network and indexing the nearest Euclidean neighbor in the state alphabet Q for the next state output. FIG. 7 shows an example of an L-category recurrent network in the RKHS, trained for classification. Since the state outputs of the L-category AR classifier were trained to discriminate among different classes based on spatial polarity, the set of accept states $FF_\ell \bullet$ for a given class $\ell$ has the maximum positive value at the $\ell$-th component of the output vector. In summary, for the multiclass formulation, the FSMs {$A_1, A_2$, ••, $A_L$} share the same first 4 elements ⟨Q, Σ, δ, $q_0$⟩ out of the 5-tuple, but with disjointly different accept states {$F_1, F_2$, ••, $F_L$}. An example of the FSM extraction method can be summarized in the algorithm of FIG. 8.

Example and Results. A novel approach to identifying flying insects using optically sensed flight information is examined. Since wing flapping behavior for flight is both nonlinear and nonstationary in nature, dynamic modeling using KAARMA provides a general framework that fully exploits the transitional and contextual information. The evaluation results demonstrate the multiclass KAARMA classifier outperforms the state-of-the-art AIR methods involving SVM and deep learning autoencoders, while using a significantly more data-efficient representation. KAARMA leverages fewer features per frame using transitional information from multiple frames in each recording to achieve an even better performance than batch learning using static patterns.

The dataset from the table in FIG. 2, consisting of 5325 flying insect passages collected over six days, in controlled laboratory conditions was used for the evaluation. The mosquito species are known vectors of deadly diseases: *Aedes aegypti* can carry and transmit dengue, West Nile virus, Zika, etc.; *Culex tarsalis,* St. Louis encephalitis, west Equine encephalitis, West Nile virus, etc.; and *Culex quinquefasciatus,* avian malaria, lymphatic filariasis, West Nile virus, etc.

Recordings were sampled at 16 kHz. Insect passages of varying duration are centered and zero-padded to generate signals of uniform length, e.g., 1 second segments. "Classification of data streams applied to insect recognition: Initial results" by V.M.A.D. Souza et al. (*Proc. BRACIS,* Fortaleza, Ceara, Brazil, 2013, pp. 76-81), which is hereby incorporated by reference in its entirety, provides an example of the detailed data preparation. Because KAARMA supports spatiotemporal signals of different length, the zero-padding was removed using a threshold-detection method (see, e.g., "Effective insect recognition using a stacked autoencoder with maximum correntropy criterion" by Y. Qi et al., *Proc. IJCNN,* Killarney, Ireland, 2015, pp. 1-7, which is hereby incorporated by reference in its entirety). This resulted in significant data reduction, since most are less than 200 ms. Each recording was segmented into frames of 20 ms, at a rate of 100 fps. Signals were bandpass filtered from 10-4000 Hz, and 40 MFCCs were extracted from each frame using a bank of 60 filters, with a pre-emphasis coefficient 0.97 and a cepstral sine lifter parameter of 22. The 40-dimensional MFCC sequences (input kernel parameter $a_u=2$) were trained using binary vector labels with magnitude β=0.25. The hidden state dimension was set at $n_x=3$, with state kernel parameter $a_s=1$. Training epoch was set at 25, with learning rate η=0.05 and quantization factor q=0.45.

A performance comparison of automatic insect recognition (AIR) algorithms is provided in the table of FIG. 9. The top half of the table in FIG. 9 shows averaged performances over 10 trials with ±one standard deviation. The best average accuracy in each column is highlighted (Note, individual accuracies are less indicative of the performance for a multiclass task, since inferior classifiers often over fit to certain classes). The first seven rows are published results in "Effective insect recognition using a stacked autoencoder with maximum correntropy criterion" by Y. Qi et al. (*Proc. IJCNN,* Killarney, Ireland, 2015, pp. 1-7), which is hereby incorporated by reference in its entirety, with state-of-the-art AIR algorithm being a robust stacked autoencoder or R-SAE coupled with SVM classifier. It takes 100 Mel-scale coefficients (40 used in KAARMA) and outputs a 50-d vector at the end of the stacked network, compared to only 8 output units (3 hidden states and 5 label states) in KAARMA. The R-SAE was trained using the maximum correntropy criterion, compared to the simple mean squared error (MSE) criterion used in KAARMA. Additionally, a separate SVM classifier with radial basis function (RBF), or Gaussian, kernel had to be train on the R-SAE outputs to achieve the reported accuracy. Despite using a more parsimonious architecture, multiclass KAARMA network performed the best with an average overall accuracy of 93.2%.

The bottom half of the table in FIG. 9 pits the best multiclass KAARMA classifiers, using 40, 20, and 12 MFCCs, against the five best batch-learned classifiers (50 MFCCs). The batch results can be viewed as upper reference performances for static pattern learning. The disclosed online adaptive classifier easily beats the batch-learned classifiers, with an overall best performance of 95.2%. Clearly, more information lies in the flight dynamics than in the number of cepstral features. Dynamic modeling using KAARMA fully exploits the transitional and contextual information within the signals.

Figure 10:
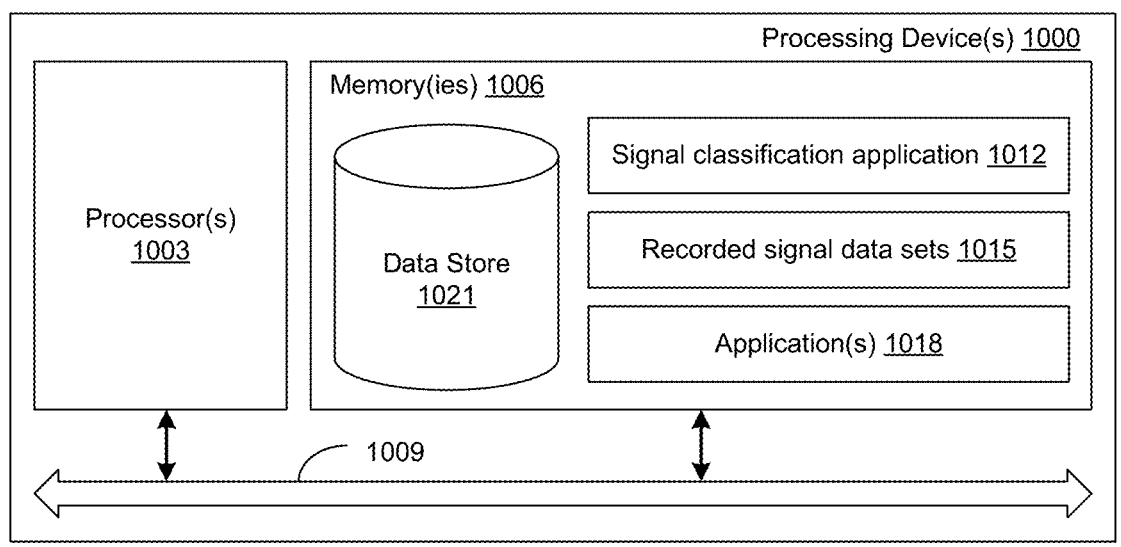
FIG. 10 is a schematic block diagram of an example of a processing device for real time detection of recurrent networks, in accordance with various embodiments of the present disclosure.

With reference now to FIG. 10, shown is a schematic block diagram of a processing device 1000 for real time detection of recurrent networks, according to an embodiment of the present disclosure. The processing device 1000 includes at least one processor circuit, for example, having a processor 1003 and a memory 1006, both of which are coupled to a local interface 1009. To this end, the processing device 1000 may be or comprise, for example, at least one computer, tablet, smart phone or like computing device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are a signal classification application 1012 (e.g., an automatic insect recognition (AIR) application) based upon recurrent or autoregressive (AR) network detection using a KAARMA network as previously discussed, one or more recorded signal data sets 1015 that may be used for training and/or testing of the recurrent or AR network, and potentially other applications 1018. Also stored in the memory 1006 may be a data store 1021 including, e.g., optical, audio, electrical and/or other recorded data. In addition, an operating system may be stored in the memory 1006 and executable by the processor 1003. It is understood that there may be other applications that are stored in the memory and are executable by the processor 1003 as can be appreciated.

Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages. A number of software components are stored in the memory and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The processor 1003 may be of electrical or of some other available construction.

Although portions of the signal classification application 1012, recorded signal data sets 1015, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The signal classification application 1012 and recorded signal data sets 1015 can comprise program instructions to implement logical function(s) and/or operations of the system. The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Also, any logic or application described herein, including the signal classification application 1012 and recorded signal data sets 1015 that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

FPGA Implementation. Once the finite state machines are extracted, they can be implemented in hardware using FPGA, ASIC, flip-flops, etc. The design of state machines or automata can be done in Verilog, and the functional correctness of the design can be verified by comparing its results with the results obtained from software MATLAB implementation. Without loss of generality, the design implement for a single network recurrent network detector will now be discussed.

Figure 11A:
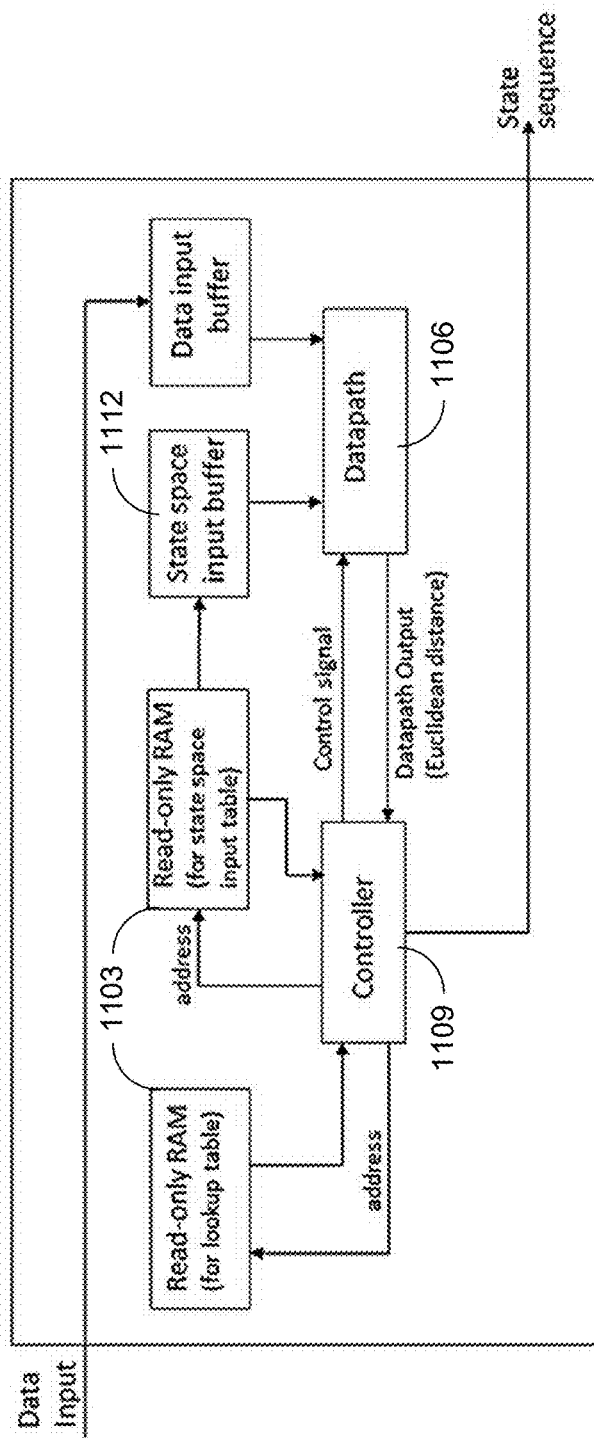
FIGS. 11A-11C illustrate a top-level module and schematic block diagram of a hardware implementation of a finite state machine or deterministic finite automaton in FPGA, in accordance with various embodiments of the present disclosure.
Figure 11B:
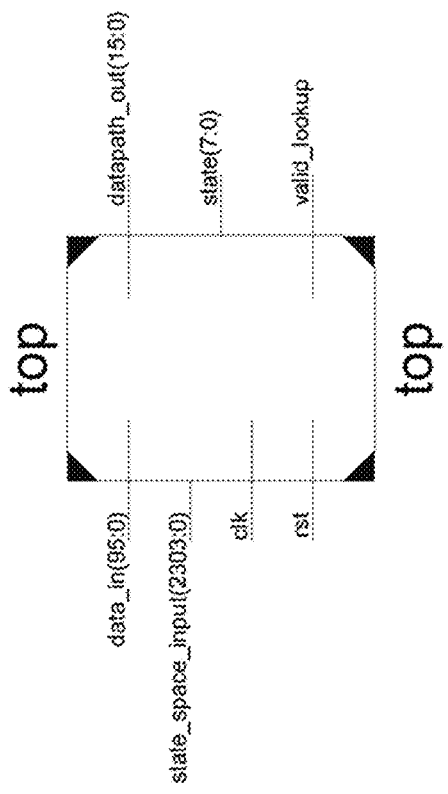
Figure 11C:
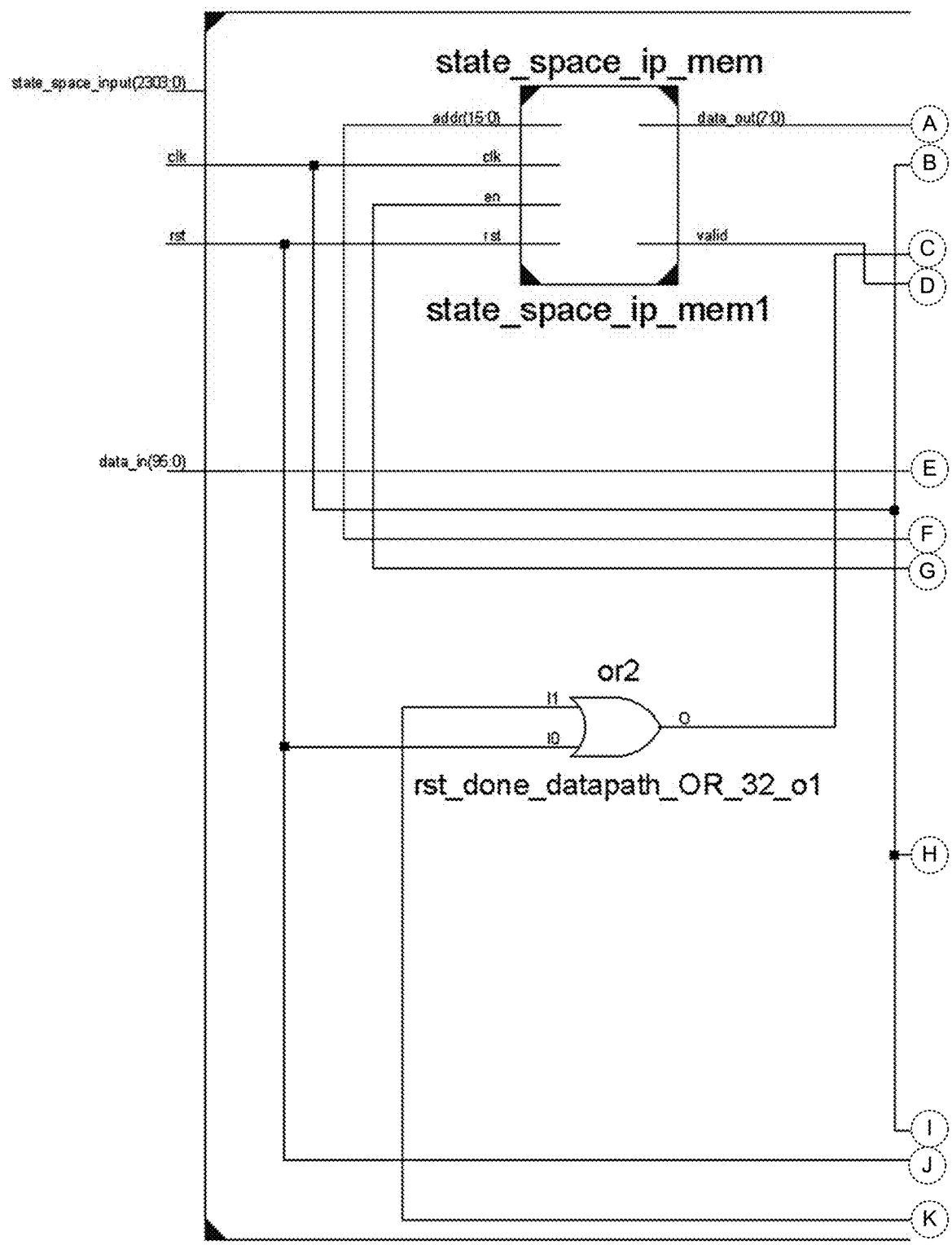
Figure 11C:
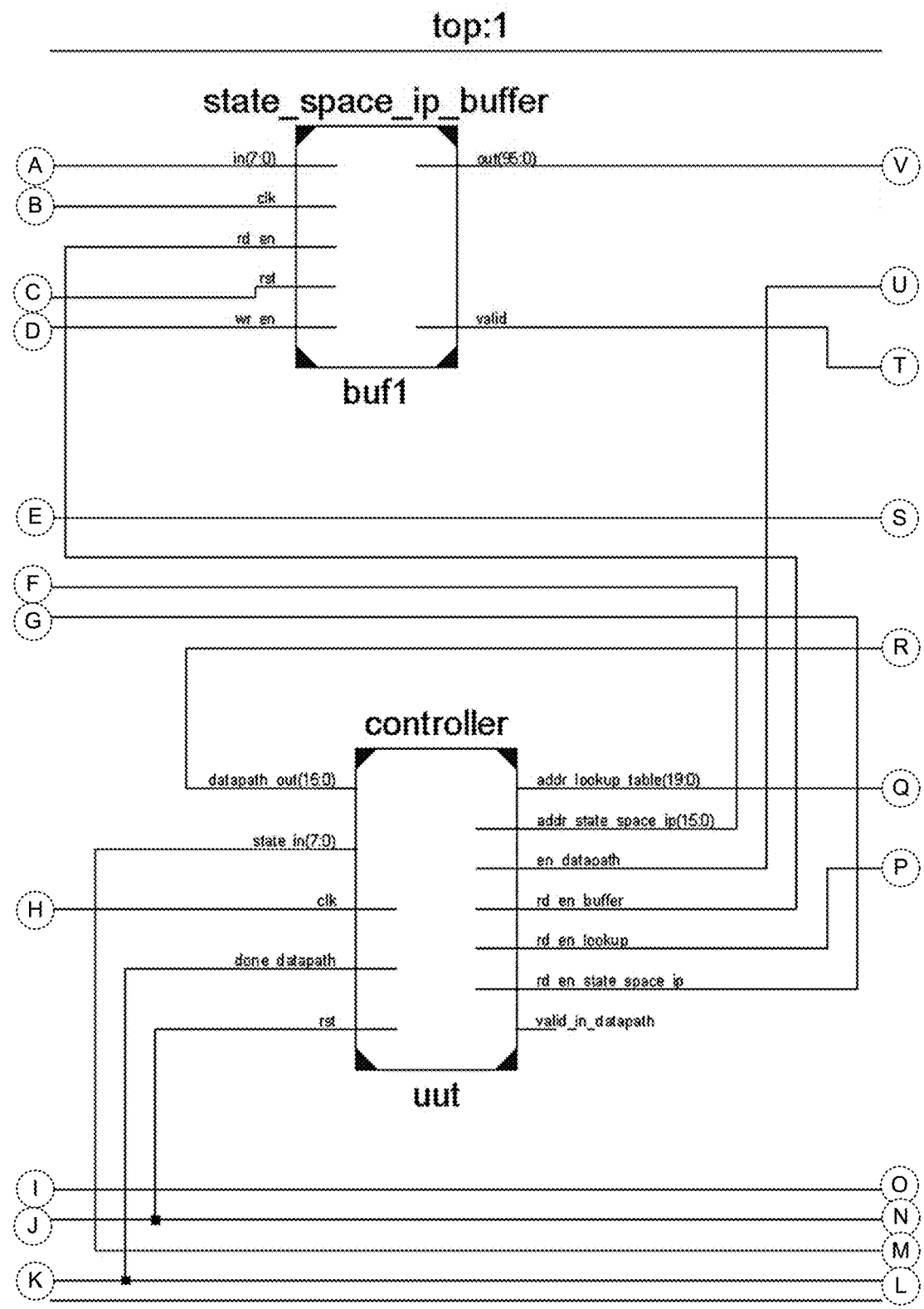
Figure 11C:
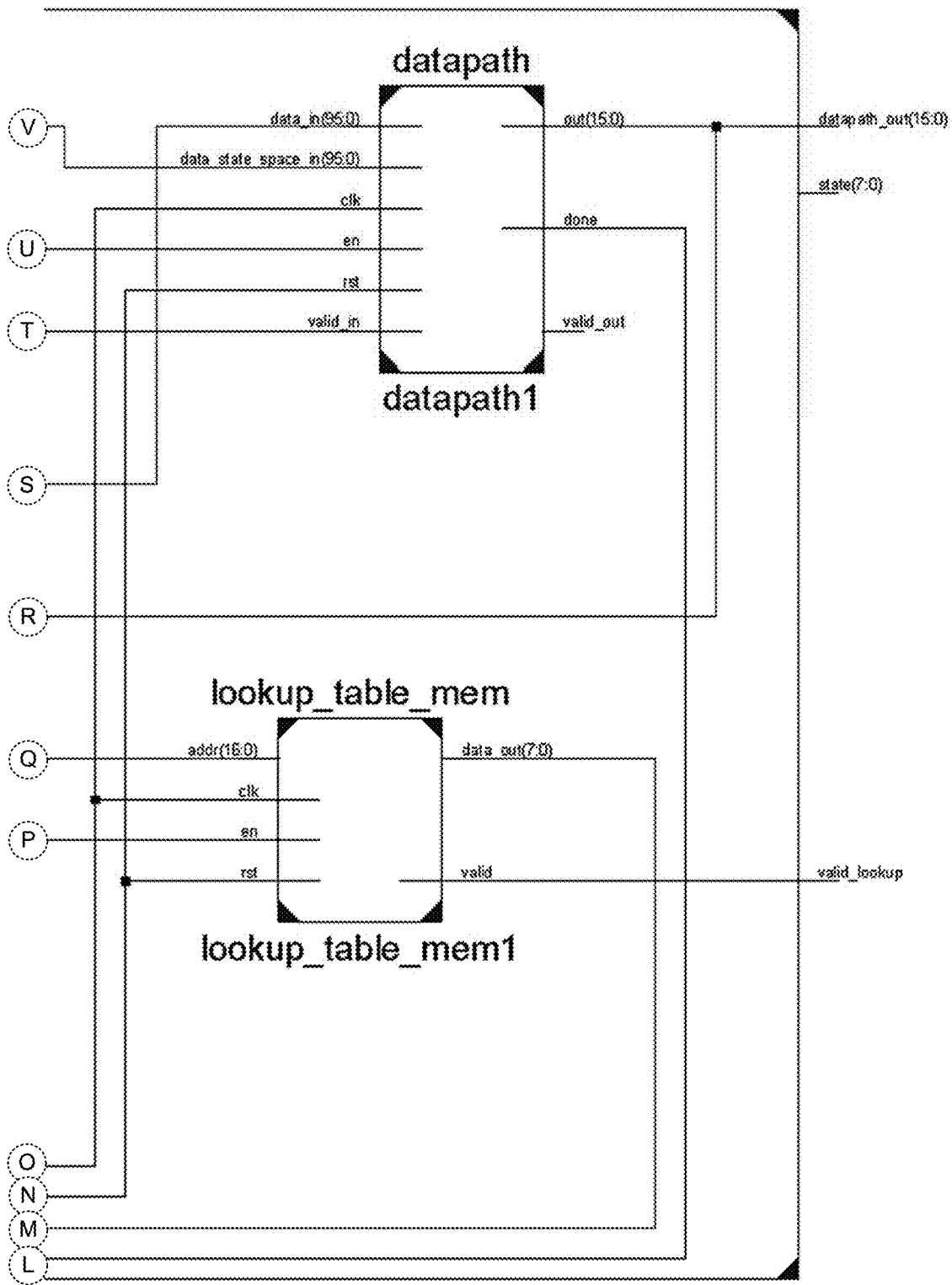

First, input quantization can be performed using the Euclidean distance between the data input vector and the input alphabet, which determines the closest corresponding index of the inputs in the lookup table or FSM. With this index and the current state (initial state is fixed for all lookup tables), the next state is located. The above set of steps can be repeated until the end of the input sequence is reached. The final state (accept/reject) determines the classification or recognition of the entire sequence. FIGS. 11A-11C illustrate the top-level module of the implementation. FIG. 11A is a schematic block diagram depicting the hardware implementation of a finite state machine or deterministic finite automaton in a FPGA. FIG. 11B shows the top-level module, and FIG. 11O shows the sub-component connections of the top-level module. The main components of the implementation are: 1) read-only RAMs 1103, 2) datapath 1106, 3) controller 1109, and 4) state-space input buffer 1112.

Read-only RAMs 1103 can store the data for the lookup (or state-transition) table with size (2344×53) and input alphabet with size (12×2344) can be stored in read-only RAM 1103. The lookup table contains the indices (1 to 53) of the next states, located by coordinates (e.g., current input, previous state). In order to store these values in RAM, they can be converted to binary representation using regular binary to decimal converter.

In the example, the input array contains 12-dimensional column vectors corresponding to each input alphabet. To properly represent the values inside this array in binary, with the minimal number of bits, the values can first be quantized, and then converted to binary: Quantization_Step= (max_value−min_value)/(27−1)=1.712/27−1=0.0135, Quantized_Value=round(absolute_value/quantization_step).

Here, the quantized values were represented with 8 bits, in the form of two's complement to represent positive and negative values. Binary representation of the input data can be obtained in the same way as the input alphabet. Since the states as well as the state space inputs are represented by 8 bits in binary, the RAMs 1103 can be implemented as: 124232×8-bit single-port Read Only RAM for lookup table and 28128×8-bit single-port Read Only RAM for input array.

Figure 12A:
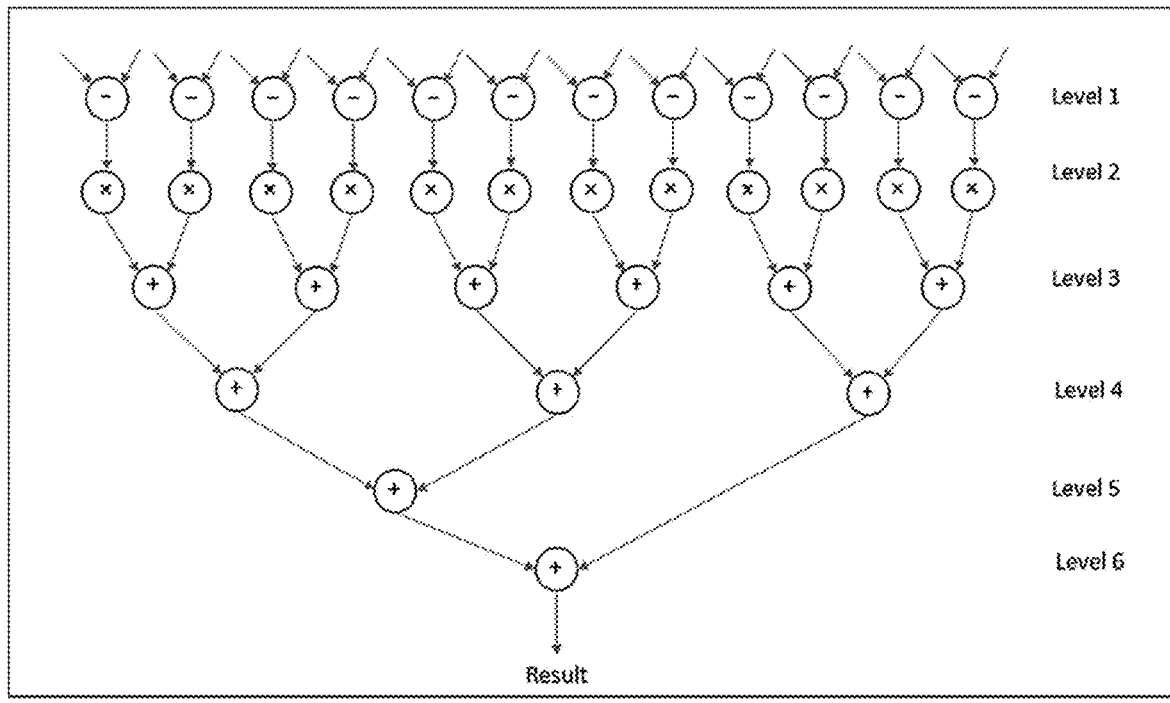
FIGS. 12A-12C illustrate the datapath of FIGS. 11A-11C for calculating the Euclidean distance in FPGA hardware, in accordance with various embodiments of the present disclosure.
Figure 12B:
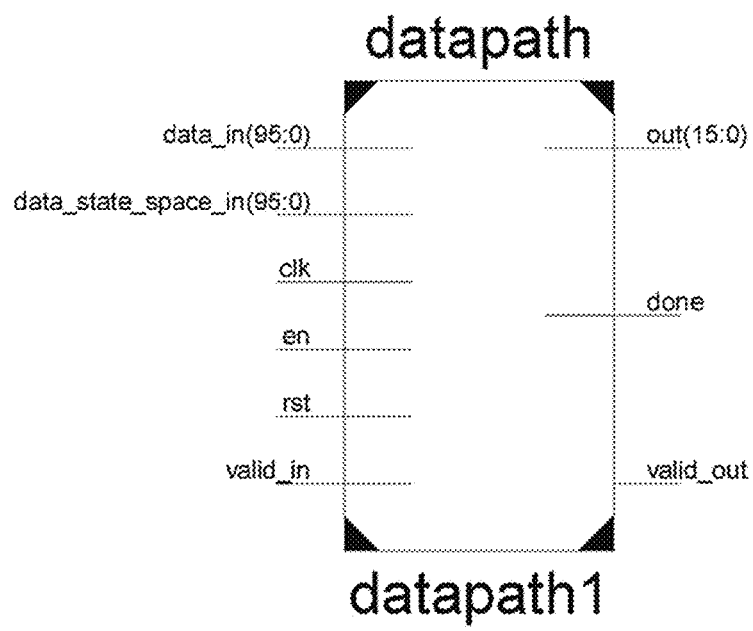
Figure 12C:
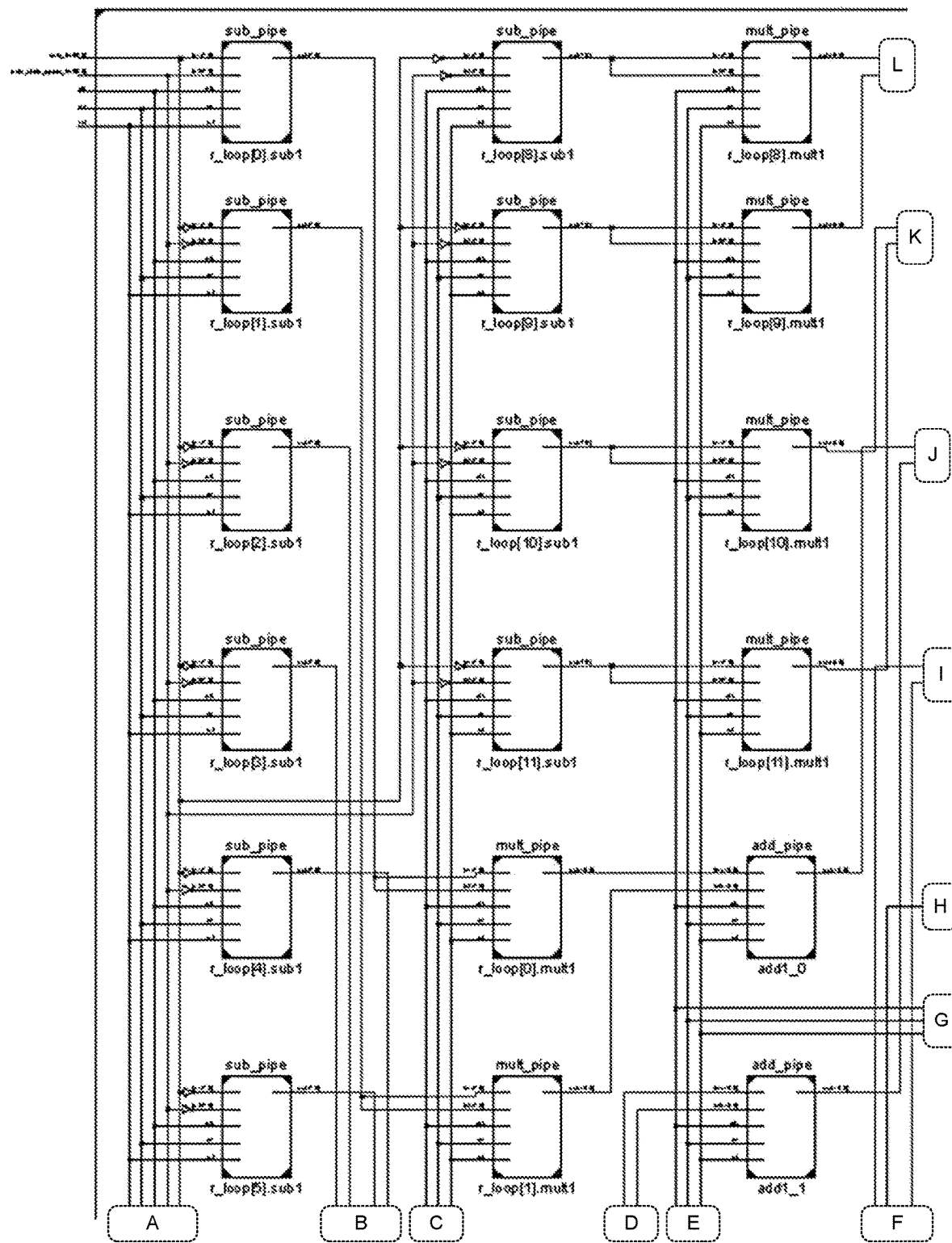
Figure 12C:
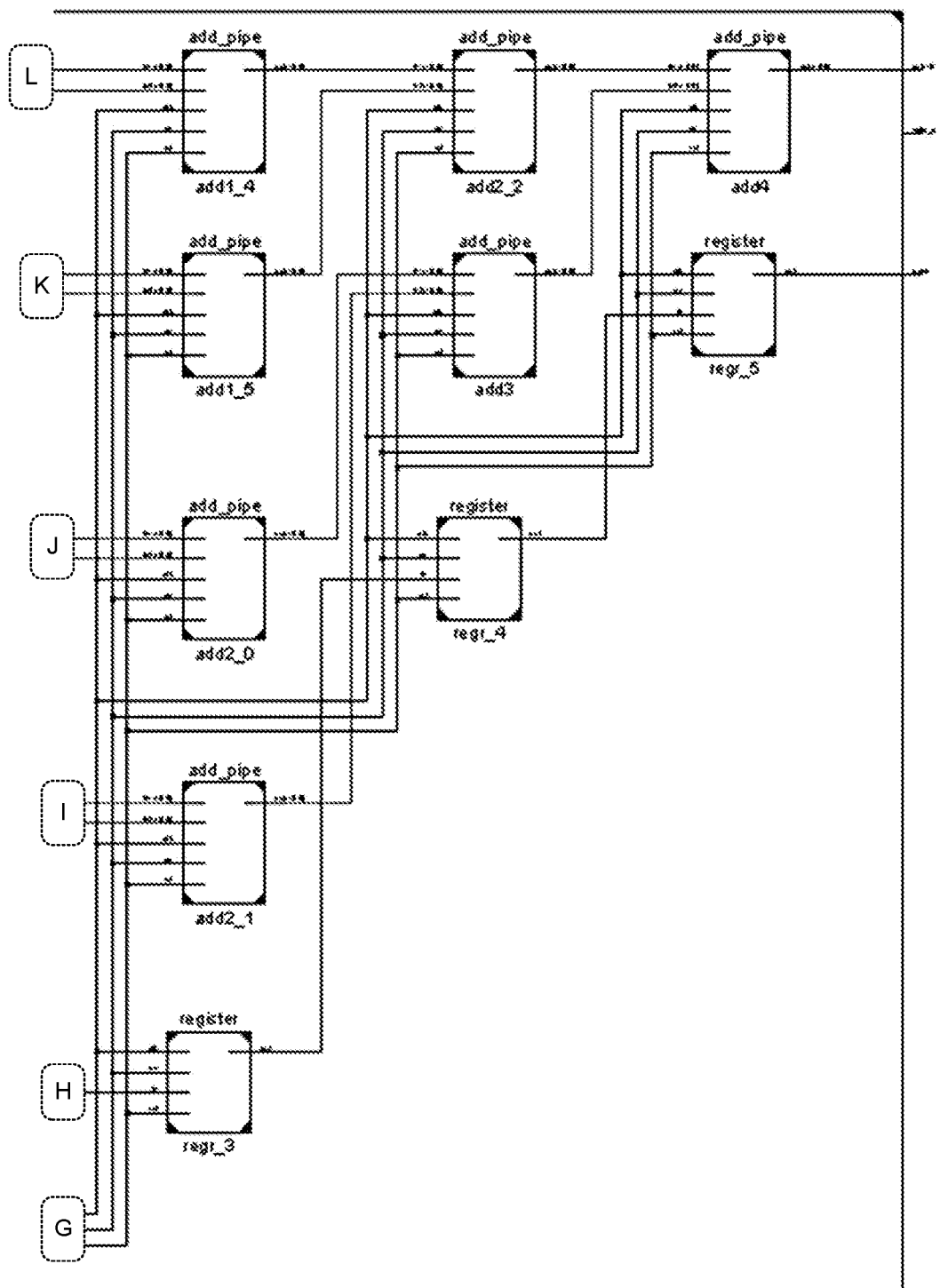
Figure 12C:
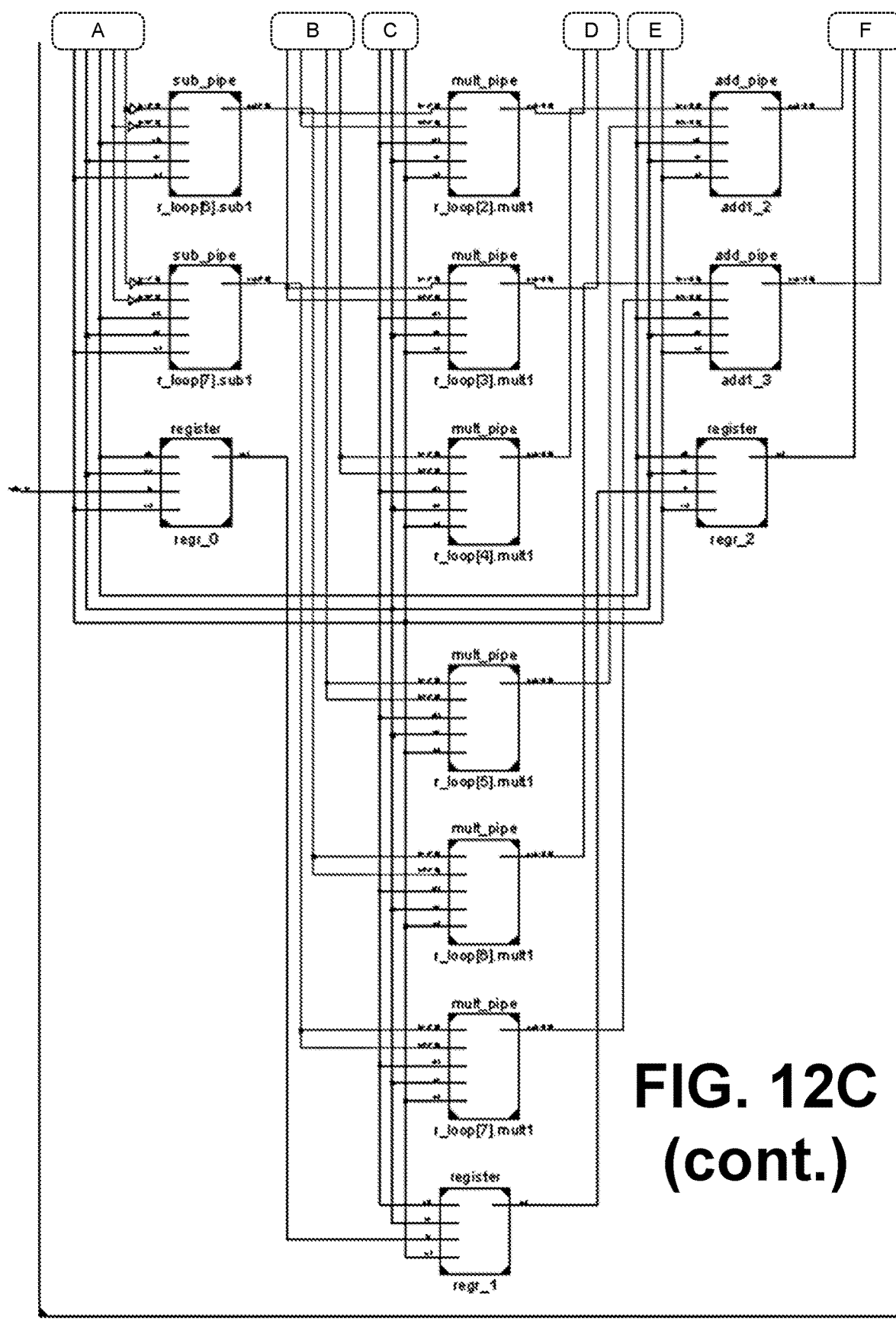

Datapath 1106 handles the computation of Euclidean distance between input data and input alphabet. Since Euclidean distance is a computationally intensive task, it can be parallelized to improve the processing time. FIG. 12A is a schematic diagram illustrating an example of the datapath 1106. FIG. 12B shows the top-level module, and FIG. 12C shows the sub-component connections of the top-level module.

As shown in FIG. 12A, both inputs to the datapath are 120 vectors. Level 1 of data path subtracts pairwise elements of both inputs simultaneously across all 12 dimensions. Level 2 squares the outputs obtained from the previous level. Level 3, 4, and 5 calculate the addition of the squares obtained in level 2. Register level is present between the output of each level and the input of next level. Using this structure for the datapath 1106, it takes six clock cycles to calculate the Euclidean distance between one pair of inputs. Note, the datapath 1106 can be pipelined to improve performance by increasing throughput.

Controller 1109 enables the datapath 1106 depending on the availability of both 12D inputs. It receives the output of the datapath 1106 and keeps track of the minimum distance encountered and the corresponding index. It also generates read addresses and a read-enable signal for both the RAMs as well as ensures proper functioning of state space input buffer.

The controller 1109 can be implemented as a five-stage finite state machine (FSM), which generates control signals for datapath and read addresses for the RAMs. It outputs the sequence of state transitions for the given set of data inputs. The segregation of the computation part and control function of the system makes it easier to accommodate future improvements such as pipelining the datapath, etc.

State-Space Input Buffer 1112 stores the 12-dimensional vector and presents it as input to the datapath 1106, since the datapath 1106 needs values for all 12 dimensions to start the operation. The buffer 1112 stores data from the input RAM depending on the valid signal from RAM.

In order to check functional correctness of the results from the FPGA implementation, simulations were carried out by running all the corresponding data through the first lookup table. The output state transition sequence was checked for equivalence with the results obtained from the MATLAB implementation. The results are identical.

Euclidean distance calculation is the most computationally intensive task in the system and hence the speed of the whole system is highly dependent on the speed of this operation. As described earlier, the datapath takes six clock cycles to compute the distance for a pair of inputs. For a sequential implementation, one round of distance computation to get the next state needs 6×2344 cycles. On average, from input to next state takes about 515.91 µs, or 51591 clock cycles (clock period used for simulation is 10 ns).

The computational efficiency can be further improved by employing pipelining, such that the Euclidean distance results are computed at every clock cycle instead of every six cycles. Thus, implementing pipelined datapath can provide a huge speedup.

Figures 13, 14:
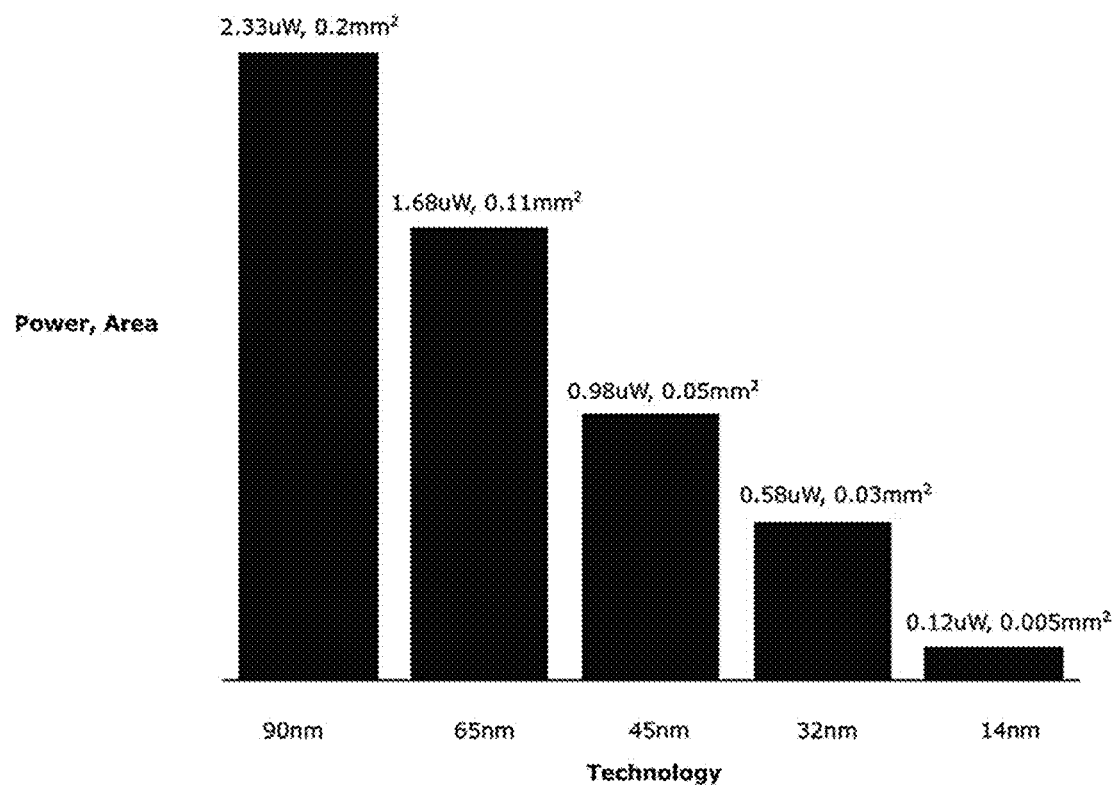
FIG. 13 is a table summarizing the power consumption and footprint of a single FSM implemented in silicon using 0.18 μm process technology and 10 KHz clock, in accordance with various embodiments of the present disclosure.
FIG. 14 is a graph showing the power consumption and footprint scaling of a single FSM to more advanced hardware fabrication technology, in accordance with various embodiments of the present disclosure.

Based on the FPGA implementation, for a single FSM, using SMIC 0.18 µm process technology and 10 KHz clock, the power and footprint measurements that were obtained are shown in FIG. 13. When scaled to state-of-the-art fabrication technologies, sub µW power consumption can be expected, effectively moving into the nW range, as shown in FIG. 14.

A novel approach to identifying flying insects using optically sensed flight information. Since flight behavior is both nonlinear and nonstationary in nature, dynamic modeling using KAARMA provides a general framework that fully exploits the transitional and contextual information. Results demonstrate that the proposed multiclass KAARMA classifier outperforms the state-of-the-art AIR methods involving SVM and deep learning autoencoders, while using significantly more data-efficient representation. KAARMA leverages fewer features per frame using transitional information from multiple frames in each recording to achieve an even better performance than batch learning using static patterns. The novel approach opens the door to many solutions in computational entomology and can be applied to other problem domains involving short-term dynamics.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method, comprising:
    training, by a first processing device, parameters of a kernel adaptive autoregressive-moving average (KAARMA) to produce a trained KAARMA using a signal of an input space, where source information is contained in time varying structure of the signal, wherein training the parameters of the KAARMA comprises:
        converting, by the first processing device, a series of input samples of the signal to corresponding reproducing kernel Hilbert space (RKHS) functions of a RKHS; and
        identifying, by the first processing device, a classification of the signal by applying at least a portion of associated hidden states of the RKHS to a recurrent network in the RKHS;
    determining, by a second processing device, a surrogate embodiment of the trained KAARMA based upon clustering of the input space, binarization of the trained KAARMA and a transition table using outputs of the trained KAARMA for each input in a training set, wherein determining the surrogate embodiment of the trained KAARMA comprises:
        clustering, by the second processing device, the input space to produce a cluster output number for each input sample;
        binarizing, by the second processing device, a state space of the trained KAARMA which maps dynamical behavior of the recurrent network into finite discrete transitions;
        extracting, by the second processing device, a deterministic coding of the recurrent network into finite state machines that can be implemented in processing circuitry; and
        generating, by the second processing device, a transition table linking a cluster output with one of the finite state machines to select a signal class indicated by a statistical model of the KAARMA; and
    implementing a recurrent network detector in the processing circuitry based upon the surrogate embodiment of the KAARMA to identify the signal class.

2. The method of claim 1, wherein training the parameters of the KAARMA comprises:
    segmenting, by the first processing device, the signal into a series of input frames;
    converting, by the first processing device, the series of input frames to corresponding reproducing kernel Hilbert space (RKHS) functions; and
    identifying, by the first processing device, the classification of the signal by applying at least a portion of the associated hidden states of the RKHS to the recurrent network in the RKHS.

3. The method of claim 1, wherein the series of input samples are converted to the RKHS functions using a first mapping, and hidden state samples of the recurrent network are converted to the associated hidden states in the RKHS using a second mapping.

4. The method of claim 1, wherein binarizing the state space is based upon a defined threshold.

5. The method of claim 1, wherein binarizing the state space is based upon attribute grammars.

6. The method of claim 1, wherein the transition table is implemented by content addressable memories.

7. The method of claim 1, wherein the transition table comprises logic statements or graphs.

8. The method of claim 1, wherein the signal comprises a spike train obtained from the signal, where the spike train is mapped directly to the RKHS via a spike train kernel.

9. The method of claim 1, wherein the processing circuitry implements an asynchronous machine.

10. A method, comprising:
    training, by a first processing device, parameters of a kernel adaptive autoregressive-moving average (KAARMA) to produce a trained KAARMA using a signal of an input space, where source information is contained in time varying structure of the signal, wherein training the parameters of the KAARMA comprises:
        converting, by the first processing device, a series of input samples of the signal to corresponding reproducing kernel Hilbert space (RKHS) functions of a RKHS; and
        identifying, by the first processing device, a classification of the signal by applying at least a portion of associated hidden states of the RKHS to a recurrent network in the RKHS;
    determining, by a second processing device, a surrogate embodiment of the trained KAARMA based upon clustering of the input space, binarization of the trained KAARMA and a transition table using outputs of the trained KAARMA for each input in a training set, wherein determining the surrogate embodiment of the KAARMA comprises:
        digitizing, by the second processing device, the input space to produce a digitized output using Voronoi tessellation, Kohonen networks or graphs;

binarizing, by the second processing device, a state space of the recurrent network which maps dynamical behavior of the recurrent network into finite discrete transitions;

extracting, by the second processing device, a deterministic coding of the recurrent network into finite state machines that can be implemented in processing circuitry; and generating, by the second processing device, a transition table linking the digitized output with one of the finite state machines to select a signal class indicated by a statistical model of the KAARMA; and implementing a recurrent network detector in the processing circuitry based upon the surrogate embodiment of the KAARMA to identify the signal class.

11. The method of claim 10, wherein binarizing the state space is based upon a defined threshold or attribute grammars.

12. The method of claim 10, wherein the recurrent network detector is implemented by the processing circuitry comprising a FPGA, an ASIC, or a dedicated VLSI chip.

13. The method of claim 10, wherein the processing circuitry comprises RAM, ROM PROM, EPROM, flip-flops or a combination thereof.

14. The method of claim 10, wherein the signal is an optical signal sensing a wingbeat of an insect, and the classification is a species of the insect.

15. The method of claim 14, wherein the optical signal is generated by a phototransistor array illuminated by a laser source, the optical signal comprising intensity fluctuations resulting from wingbeat occlusions by the insect.

16. The method of claim 10, wherein the signal is a speech signal, a video signal, multi-dimensional sensed inputs in industrial installations, or a signal from natural phenomena.

17. The method of claim 10, wherein the processing circuitry implements an asynchronous machine.

18. The method of claim 10, wherein training the parameters of the KAARMA comprises:

segmenting, by the first processing device, the signal into a series of input frames;

converting, by the first processing device, the series of input frames to corresponding reproducing kernel Hilbert space (RKHS) functions; and identifying, by the first processing device, the classification of the signal by applying at least a portion of the associated hidden states of the RKHS to the recurrent network in the RKHS.

19. The method of claim 10, wherein the series of input samples are converted to the RKHS functions using a first mapping, and hidden state samples of the recurrent network are converted to the associated hidden states in the RKHS using a second mapping.

20. The method of claim 10, wherein the signal comprises a spike train obtained from the signal, where the spike train is mapped directly to the RKHS via a spike train kernel.

* * * * *